(12) United States Patent
Williams et al.

(10) Patent No.: US 11,777,380 B2
(45) Date of Patent: Oct. 3, 2023

(54) MOTOR DRIVE UNIT

(71) Applicant: ITT Manufacturing Enterprises LLC, Wilmington, DE (US)

(72) Inventors: Dean P. Williams, Moravia, NY (US); Mark A. Playford, Seneca Falls, NY (US); Daniel J. Kernan, Seneca Falls, NY (US); Lee Empringham, Beeston (GB); Liliana V. De Lillo, Beeston (GB); Christopher J. F. Tighe, Hathern (GB)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 0 days.

(21) Appl. No.: 17/444,902

(22) Filed: Aug. 11, 2021

(65) Prior Publication Data
US 2021/0376695 A1    Dec. 2, 2021

Related U.S. Application Data

(63) Continuation of application No. 17/078,800, filed on Oct. 23, 2020, now Pat. No. 11,489,418, which is a
(Continued)

(51) Int. Cl.
*H02K 11/33* (2016.01)
*H02K 5/15* (2006.01)
(Continued)

(52) U.S. Cl.
CPC .............. *H02K 11/33* (2016.01); *H02K 5/15* (2013.01); *H02K 5/18* (2013.01); *H02K 5/225* (2013.01);
(Continued)

(58) Field of Classification Search
CPC .......... H02K 11/33; H02K 11/27; H02K 5/18; H02K 5/22; H02K 7/14; H02K 9/06;
(Continued)

(56) References Cited

U.S. PATENT DOCUMENTS

| 4,468,725 A | 8/1984 | Venturini |
| 5,006,744 A * | 4/1991 | Archer .................... H02K 11/33 310/58 |

(Continued)

FOREIGN PATENT DOCUMENTS

| CN | 101878582 | 11/2010 |
| DE | 9305174.3 | 12/1993 |

(Continued)

OTHER PUBLICATIONS

Office Action in Brazilian Application No. BR112018068264-0, dated Jun. 22, 2022.
(Continued)

*Primary Examiner* — Leda T Pham
(74) *Attorney, Agent, or Firm* — Knobbe, Martens, Olson & Bear, LLP

(57) ABSTRACT

A motor assembly for driving a pump or rotary device features a power plane with a circular geometry to be mounted inside a space envelope having a similar circular geometry formed on an end-plate between an inner hub portion and a peripheral portion that extends circumferentially around the space envelope of the end-plate. The power plane is a multi-layer circuit board or assembly having: a power layer with higher temperature power modules for providing power to a motor, a control layer with lower temperature control electronics modules for controlling the power provided to the motor, and a thermal barrier and printed circuit board layer between the power layer and the control layer that provides electrical connection paths
(Continued)

between the power modules of the power plane and the control electronics modules of the control layer, and also provides insulation between the power layer and the control layer.

19 Claims, 27 Drawing Sheets

Related U.S. Application Data continuation of application No. 15/456,761, filed on Mar. 13, 2017, now Pat. No. 10,855,146.

(60) Provisional application No. 62/307,037, filed on Mar. 11, 2016.

(51) Int. Cl.
    *H02K 11/27* (2016.01)
    *H02K 5/18* (2006.01)
    *H02K 5/22* (2006.01)
    *H02K 7/14* (2006.01)
    *H02K 9/06* (2006.01)

(52) U.S. Cl.
    CPC ............. *H02K 7/14* (2013.01); *H02K 9/06* (2013.01); *H02K 11/27* (2016.01); *H02K 2211/03* (2013.01)

(58) Field of Classification Search
    CPC . H02K 11/00; H02K 1/32; H02K 3/24; H02K 9/00
    See application file for complete search history.

(56) References Cited

U.S. PATENT DOCUMENTS

| | | | |
|---|---|---|---|
| 5,491,370 A | 2/1996 | Schneider et al. | |
| 5,714,816 A * | 2/1998 | Jensen | H02K 11/33 310/68 R |
| 5,763,969 A | 6/1998 | Metheny et al. | |
| 5,939,807 A | 8/1999 | Patyk et al. | |
| 5,960,535 A | 10/1999 | Rubens et al. | |
| 6,065,946 A | 5/2000 | Lathrop | |
| 6,177,740 B1 | 1/2001 | Burns | |
| 6,198,183 B1 | 3/2001 | Baeumel et al. | |
| 6,249,068 B1 | 6/2001 | Knopp | |
| 6,307,337 B1 | 10/2001 | Nelson | |
| 6,496,343 B2 | 12/2002 | Mahlein et al. | |
| 6,559,532 B1 | 5/2003 | Schwarzbauer et al. | |
| 6,603,647 B2 | 8/2003 | Briesen et al. | |
| 6,704,215 B2 | 3/2004 | Simon | |
| 6,720,689 B2 * | 4/2004 | Agnes | H02K 11/33 310/43 |
| 6,744,650 B2 | 6/2004 | Briesen et al. | |
| 6,856,038 B2 | 2/2005 | Rebsdorf et al. | |
| 7,180,212 B2 | 2/2007 | Anwar et al. | |
| 7,199,496 B2 * | 4/2007 | Suzuki | H02K 11/33 310/68 R |
| 7,362,017 B2 | 4/2008 | Piper et al. | |
| 7,781,925 B2 | 8/2010 | Lacaze | |
| 7,848,121 B2 | 12/2010 | Kojori et al. | |
| 7,881,087 B2 | 2/2011 | Sakakibara et al. | |
| 7,911,093 B2 | 3/2011 | Schueren | |
| 8,007,565 B2 | 8/2011 | Moredock | |
| 8,216,330 B2 | 7/2012 | Moredock et al. | |
| 8,310,121 B2 | 11/2012 | Fujita et al. | |
| 8,564,997 B2 | 10/2013 | Urushibata et al. | |
| 8,576,528 B2 | 11/2013 | Nagano et al. | |
| 8,829,723 B2 | 9/2014 | Graovac et al. | |
| 8,837,119 B2 | 9/2014 | Kishimoto et al. | |
| 8,931,528 B2 | 1/2015 | Hsiung | |
| 8,964,424 B2 | 2/2015 | Sakakibara | |
| 9,238,918 B2 | 1/2016 | McKinzie | |
| 9,351,432 B2 * | 5/2016 | Tsuboi | H05K 7/20854 |
| 9,356,494 B2 | 5/2016 | Motoda et al. | |
| 9,419,552 B2 | 8/2016 | Schock et al. | |
| 9,667,124 B2 | 5/2017 | Utsumi et al. | |
| 9,705,420 B2 | 7/2017 | Quevedo et al. | |
| 9,812,920 B2 | 11/2017 | McKinzie et al. | |
| 9,822,782 B2 | 11/2017 | McKinzie | |
| 9,923,456 B2 * | 3/2018 | Yoshinaga | H02M 5/297 |
| 10,090,738 B2 | 10/2018 | Schock et al. | |
| 10,119,528 B2 | 11/2018 | Fujii et al. | |
| 10,345,056 B2 | 7/2019 | Rollins et al. | |
| 10,715,010 B2 | 7/2020 | Palmer et al. | |
| 10,804,830 B1 | 10/2020 | Zhang et al. | |
| 10,855,146 B2 | 12/2020 | Williams | |
| 10,928,144 B2 | 2/2021 | Rollins et al. | |
| 11,183,896 B2 | 11/2021 | Guedes-Pinto et al. | |
| 2001/0021116 A1 | 9/2001 | Bruckmann et al. | |
| 2002/0158524 A1 | 10/2002 | Bobay et al. | |
| 2009/0039741 A1 | 2/2009 | Heining | |
| 2010/0149848 A1 | 6/2010 | Urushibata et al. | |
| 2011/0101804 A1 | 5/2011 | Isoda et al. | |
| 2011/0176340 A1 | 7/2011 | Sakakibara | |
| 2012/0020021 A1 | 1/2012 | Kishimoto et al. | |
| 2013/0127251 A1 | 5/2013 | Graovac et al. | |
| 2013/0328424 A1 | 12/2013 | Goto | |
| 2014/0139059 A1 * | 5/2014 | De Filippis | H02K 11/33 310/64 |
| 2014/0265664 A1 | 9/2014 | Camilleri et al. | |
| 2014/0306361 A1 | 10/2014 | Pugh et al. | |
| 2015/0229233 A1 | 8/2015 | Quevedo et al. | |
| 2016/0006325 A1 * | 1/2016 | Grabner | H02K 11/33 310/62 |
| 2018/0115225 A1 | 4/2018 | Togawa et al. | |
| 2018/0205292 A1 * | 7/2018 | Lee | H02K 9/14 |
| 2020/0212756 A1 | 7/2020 | Zhong et al. | |
| 2020/0343792 A1 | 10/2020 | Palmer et al. | |
| 2020/0373813 A1 | 11/2020 | Ebelt et al. | |
| 2021/0123441 A1 | 4/2021 | Coupart et al. | |
| 2021/0123442 A1 | 4/2021 | Schrader et al. | |
| 2021/0135549 A1 | 5/2021 | Lee et al. | |
| 2021/0152060 A1 | 5/2021 | Williams et al. | |
| 2021/0164740 A1 | 6/2021 | Rollins et al. | |
| 2021/0218304 A1 | 7/2021 | Schuler et al. | |
| 2021/0226498 A1 | 7/2021 | Williams et al. | |
| 2021/0288561 A1 | 9/2021 | Kato | |
| 2021/0305871 A1 | 9/2021 | Yamakage et al. | |
| 2022/0014077 A1 | 1/2022 | Williams et al. | |
| 2022/0021283 A1 | 1/2022 | Williams et al. | |
| 2022/0021284 A1 | 1/2022 | Williams et al. | |

FOREIGN PATENT DOCUMENTS

| | | |
|---|---|---|
| DE | 19618996 | 11/1997 |
| DE | 19622396 | 12/1997 |
| DE | 19703655 | 8/1998 |
| DE | 20004437 | 6/2000 |
| DE | 10005449 | 8/2001 |
| EP | 0149533 | 9/1990 |
| EP | 0812052 | 12/1997 |
| EP | 1311057 | 5/2003 |
| EP | 1973222 | 9/2008 |
| EP | 1495533 | 3/2009 |
| EP | 2156541 | 11/2012 |
| EP | 2849549 | 3/2015 |
| JP | H011-27903 | 5/1989 |
| JP | 2011-505786 | 2/2011 |
| JP | 2014-154745 | 8/2014 |
| JP | 2015-099829 | 5/2015 |
| JP | 2015-201490 A | 11/2015 |
| KR | 10-2010-0103513 A | 9/2010 |
| RU | 2005116261 | 1/2006 |
| RU | 2497263 | 12/2011 |
| WO | WO 2005/119885 A1 | 12/2005 |
| WO | WO 2009/069103 | 6/2009 |
| WO | WO 2011/093200 | 8/2011 |
| WO | WO 2013/008266 A1 | 1/2013 |

(56) References Cited

FOREIGN PATENT DOCUMENTS

| WO | WO 2015/072467 | 5/2015 |
|---|---|---|
| WO | WO 2015/122069 A1 | 8/2015 |

OTHER PUBLICATIONS

Apap, Maurice, "Direct Converter Technology Applied to an Integrated Motor Drive". Doctor of Philosophy Thesis, Dec. 2005.

Casadei, Domenico et al., "Optimal Use of Zero Vectors for Minimizing the Output Current Distortion in Matrix Converters", IEEE Transactions on Industrial Electronics, vol. 56, No. 2, Feb. 2009, pp. 326-336.

China National Intellectual Property Administration, First Office Action Regarding Application No. 201780015441.0, dated Oct. 28, 2019, and translation, 21 pages.

European Examination Report for EP17719036, dated Jan. 13, 2021 in 5 pages.

Examination Report No. 1 for Australian Application No. 2017230115, dated Jan. 20, 2021 in 12 pages.

Indian Office Action for Application No. 201817027651, dated Oct. 13, 2020 in 6 pages.

International Preliminary Report on Patentability for PCT/US2017/022019, dated Sep. 11, 2018 in 9 pages.

International Search Report for PCT Application No. PCT/US2017/022019, dated Jul. 27, 2017 in 3 pages.

Russian Office Action for Application No. 2018130979, dated May 18, 2020, in 6 pages.

Russian Search Report for Application No. 2018130979, dated May 18, 2020 in 2 pages.

The Second Office Action for Application No. CN201780015441.0, dated Jul. 8, 2020 in 9 pages.

Wheeler, P.W. et al. "A Fully Integrated 30kW Motor Drive Using Matrix Converter Technology", IEEE Xplore, pp. 2390-2395, downloaded on Mar. 25, 2009.

Written Opinion for PCT/US2017/022019 in 5 pages.

\* cited by examiner (Power Plane Side, S2)
Mid-Plate, E (Motor Side, S1)
Mid-Plate, E (Fan Side)

(Mid-Plate Side)

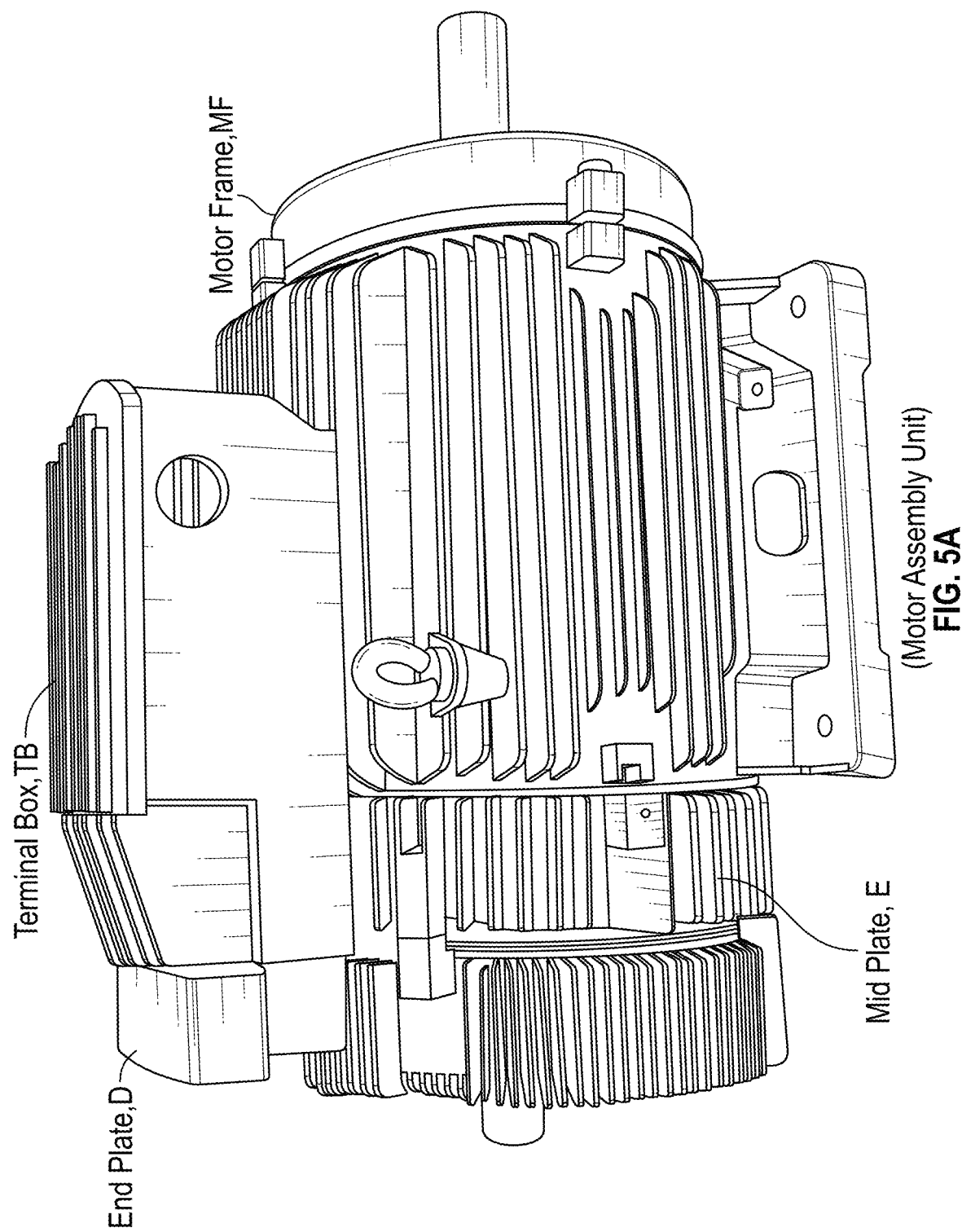
FIG. 5A (Motor Assembly Unit)

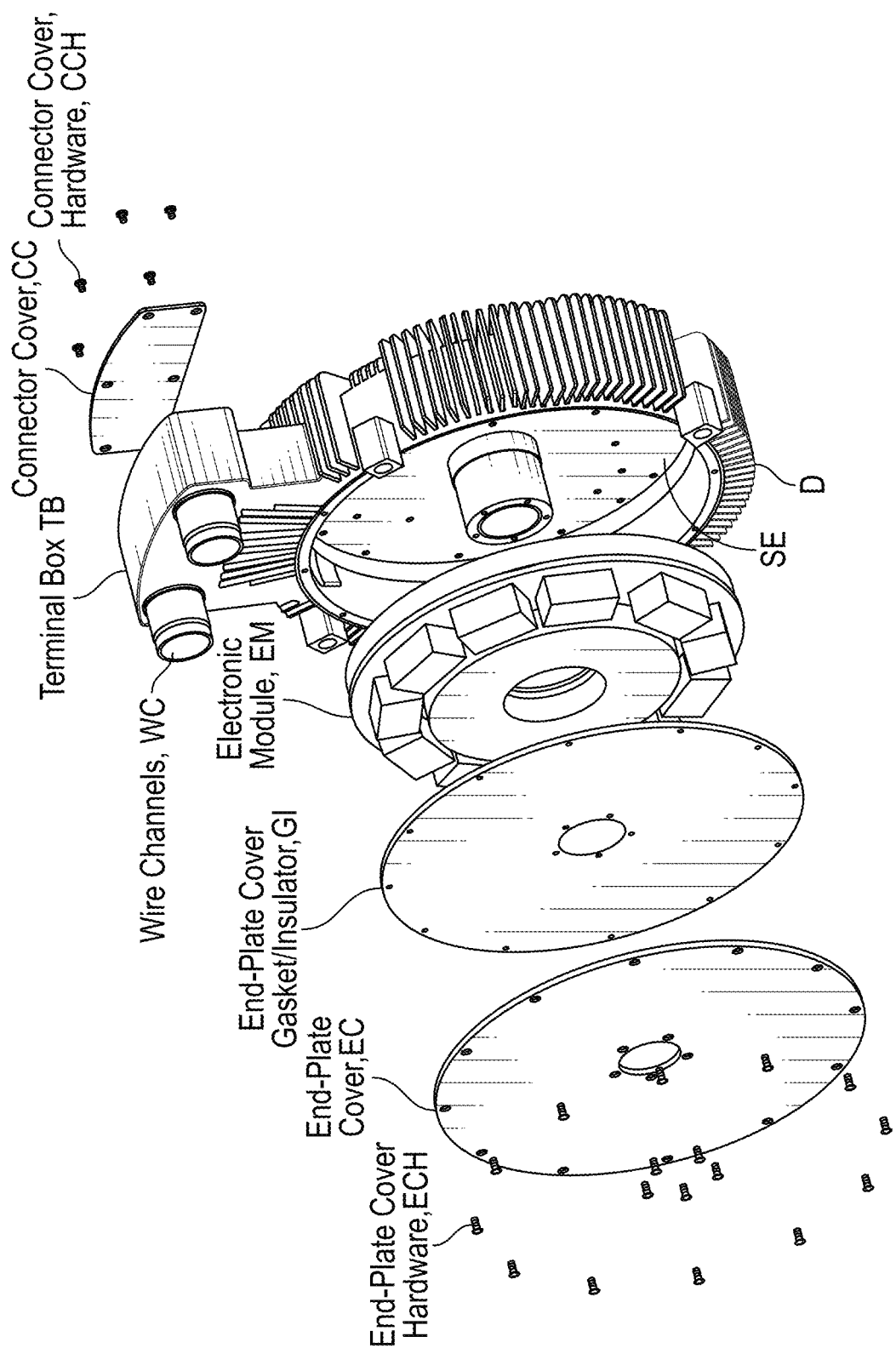
FIG. 5D (Self-Contained Drive Module Assembly)

(Bi-Directional Swtich)

(Bi-Directional Swtich Power Module)

(40HP EMD Prototype Input Voltage and Current Waveform)

(W/ Electronics Module)

(W/ Electronics Module)

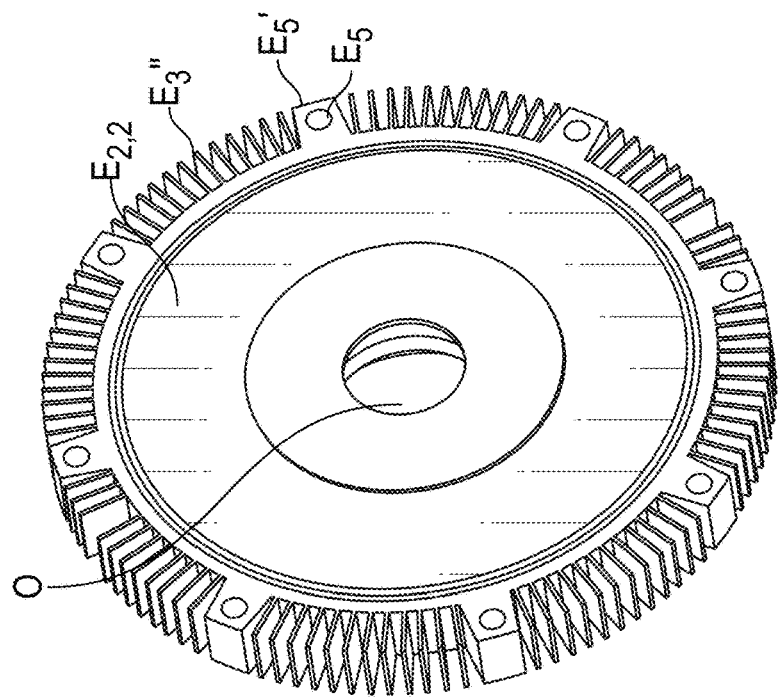
(Power Plane Side, S2)
FIG. 13A(2)
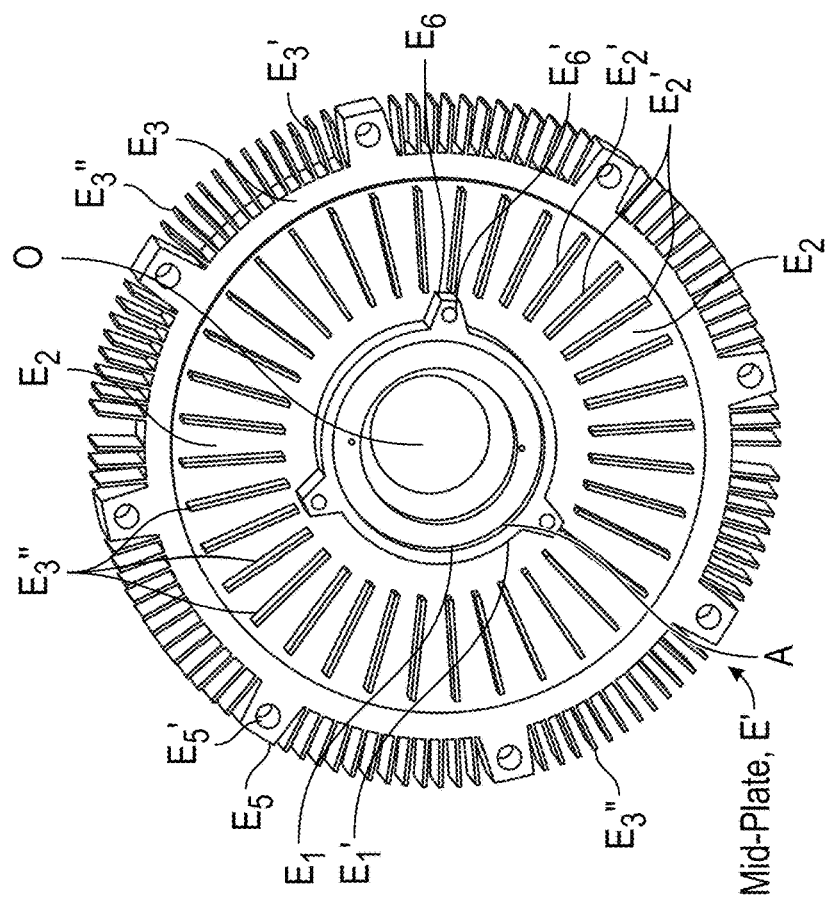
(Motor Side, S1)
FIG. 13A(1)

(Mid-Plate E' and E")

(Fan Side)

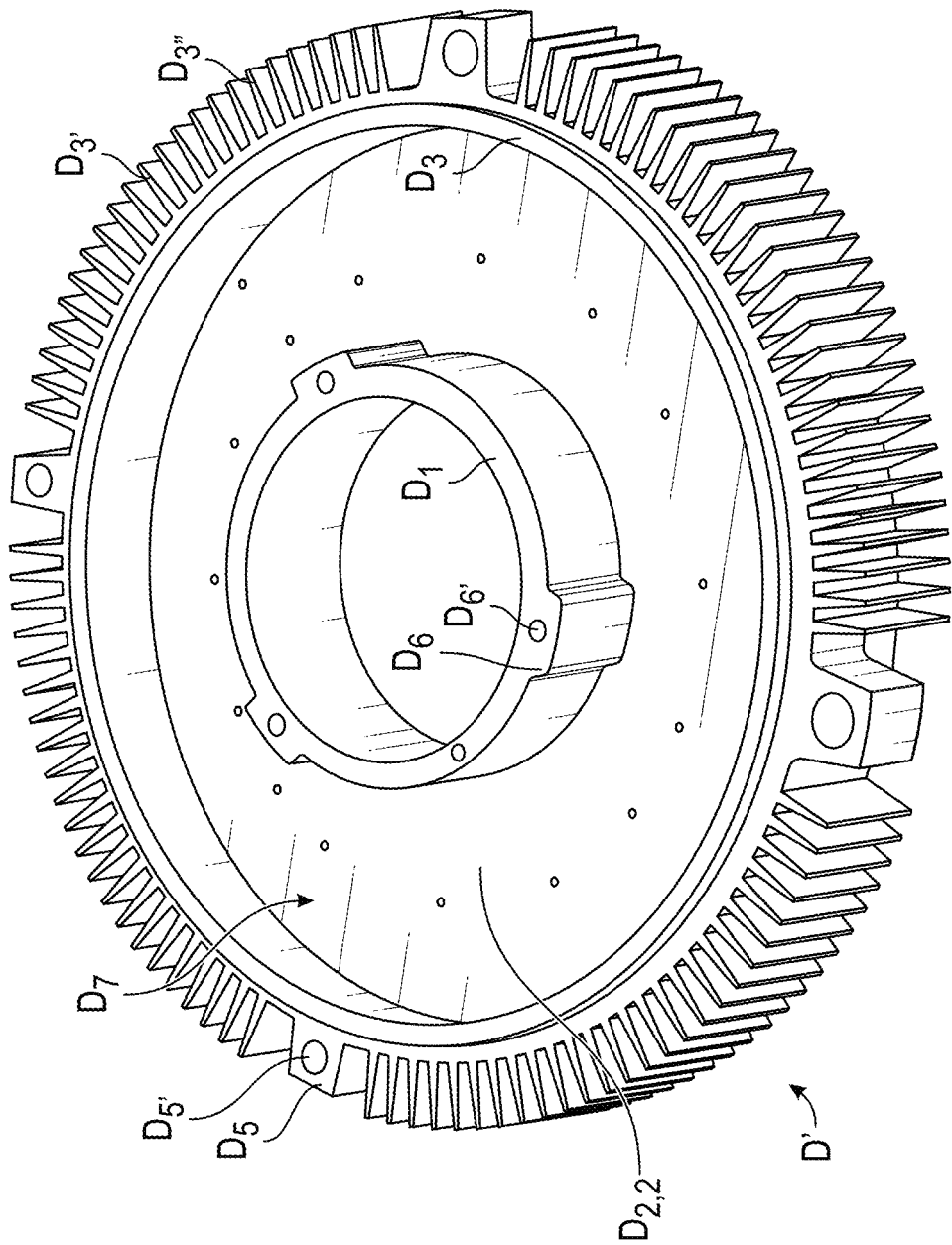
FIG. 14B (Mid-Plate Side)

(Motor Assembly, Test Unit)

MOTOR DRIVE UNIT

CROSS REFERENCE TO RELATED APPLICATION

Any and all applications for which a foreign or domestic priority claim is identified in the Application Data Sheet of the present application are hereby incorporated by reference in their entireties under 37 CFR 1.57.

NAMES OF PARTIES TO JOINT RESEARCH AGREEMENT

The subject matter disclosed in this application was developed and the claimed invention was made by, or on behalf of, ITT Inc. or its affiliates and/or the University of Nottingham, which are parties to a joint research agreement that was in effect on or before the effective filing date of the claimed invention. The claimed invention was made as a result of activities undertaken within the scope of the joint research agreement.

BACKGROUND OF THE INVENTION

Field of the Invention

This application relates to a technique for increasing the power density of the electronics of a variable frequency drive and reducing the sensitivity of electronics of a variable frequency drive to high temperatures for the purpose of installing the variable speed electronics inside a motor assembly; and more particularly to a technique for reducing the sensitivity of electronics of a variable frequency drive to high temperatures, e.g., using a uniquely designed mid-plate and end-plate.

Brief Description of Related Art

In the prior art, it is known that electronics of a variable frequency drive are typically sensitive to high temperatures, and can improperly operate or fail prematurely if operated at their maximum rating when combined with a motor assembly, and that the electronics need a sealed enclosure contained within the motor envelope that protects the electronics from both harsh environments and excessive heat. The motor normally operates at a temperature much higher than safe electronic operation. When one combines these two devices, the losses (heat) created from the motor's operation will cause a high temperature condition, that is unhealthy to the operation of the variable frequency drive.

To put this into some perspective, a premium efficient motor may be 94-95% efficient. Thus, 5-6% of its rating is wasted from a loss of heat measured in relation to watts loss or heat. For a variable frequency drive, it might be 96-97% efficient. Therefore, in a 50 HP system, the heat loss calculation may take the form of: 50 HP×746 watts/HP=37,300 watts, and 37,300 watts×10%=3,730 watts of waste heat.

Specifically, the 4% overall drive losses would split up as follows: approximately 85% in the power modules contained in the end-plate, 10% in the power quality filter, and 6% in the rest of the motor.

In view of this, there is a need in the art to provide a better way to reduce the sensitivity of the electronics of the variable frequency drive to high temperatures, so as to eliminate or reduce substantially the improper operation or failure prematurely of such electronics of such a variable frequency drive if operated at their maximum rating.

SUMMARY OF THE INVENTION

An objective of the present invention is to install an electronic variable frequency drive inside the same size envelope as a standard National Electrical Manufacturers Association (NEMA) or International Electrotechnical Commission (IEC) rated motor of the same power rating, thereby allowing variable speed operation of the motor and any pump or rotary device it controls.

The Basic Apparatus

According to some embodiments, the present invention may take the form of apparatus, e.g., such as a motor assembly for driving a pump or rotary device, having at least one plate having two sides, one side having a central portion, an intermediate portion and a peripheral portion.

The central portion may include, or be configured with, an opening to receive and arrange the at least one plate in relation to a rotor, e.g., of a motor drive the pump or rotary device.

The intermediate portion may be configured between an inner circumference of the central portion and the peripheral portion, and may include a multiplicity of internal radial cooling fins extending from the inner circumference of the central portion and diverging outwardly towards the peripheral portion to transfer heat from the central portion to the peripheral portion allowing for internal conduction heat capability.

The peripheral portion may include an outer circumferential surface having a multiplicity of external radial cooling fins diverging outwardly away from the plate to transfer the heat to surrounding air allowing for external convection heat capability.

The at least one plate may be, or take the form of, a mid-plate, an end-plate, or a combination thereof, that form part of the pump or rotary device, consistent with that set forth herein.

Mid-Plate Embodiments

For example, the at least one plate may include, or take the form of, a mid-plate having a bearing housing flange portion configured to receive a motor bearing assembly, and also configured with the opening to receive the motor rotor shaft.

Mid-plate embodiments may also include one or more of the following features:

The apparatus may be, or take the form of, the motor assembly for driving the pump or rotary device, e.g., having a combination of the rotor and the motor bearing assembly having a bearing assembly arranged on the rotor.

The other of the two sides may be a smooth side having a corresponding intermediate portion with no internal or external cooling fins.

The motor assembly may include an insulation layer arranged in relation to the mid-plate, and configured to reduce the rate of heat transfer, including all forms of heat transfer from conduction, convection and radiation. By way of example, the insulation layer may be made of mica.

The motor assembly may include a power plane having electrical components, including electronics of a variable frequency drive, and the mid-plate may be configured so that the smooth side is facing the power plane In operation, the heat may be transferred via conduction from the rotor through the mid-plate and the internal radial cooling fins to the external radial cooling fins, and may also then be transferred via convection from the external radial cooling fins to the surrounding air. The mid-plate may be configured to absorb the heat both via conduction from the rotor through the bearing assembly, and via convection through the external radial cooling fins located in the air chamber of the motor, including the heat generated from the motor from electrical and mechanical losses, including from either motor end windings, resistive or eddy currents, or both, that cause the rotor to directly conduct heat as well as to release the heat into an air chamber of the motor.

The mid-plate may be configured to provide a thermal path either from the motor end-windings to the airflow on the outside of a stator, or from the rotor to the ambient through the bearing assembly, or both.

The motor assembly may include front and rear grease retainer configured on each side of the motor bearing housing.

The motor assembly may include an insulating gasket assembly configured on the mid-plate to minimize thermal contact between the mid-plate and an end-plate.

By way of example, the mid-plate may be made of copper, aluminum or cast iron.

The mid-plate may include an outside insulation layer that limits heat flow from a mid-plate heat sink to a power converter area having a power plane and limits heat into an end-plate electronics area that form part of the end-plate.

The internal radial cooling fins of the mid-plate may be configured on and about the intermediate portion substantially uniformly and equidistantly spaced from one another.

The external radial cooling fins of the mid-plate may be configured on and about the peripheral portion uniformly and equidistantly spaced from one another.

By way of example, the mid-plate may have more external radial cooling fins then the internal radial cooling fins, including more than twice as many.

End-Plate Embodiments

By way of further example, the at least one plate may include, or take the form of, an end-plate, where the opening of the central portion is configured to receive and engage the motor rotor shaft.

End-plate embodiments may also include one or more of the following features:

The other of the two sides may be a smooth side having a corresponding intermediate portion with no internal or external cooling fins.

The apparatus may include a motor assembly having a power plane with electrical components, including electronics of a variable frequency drive, the end-plate may be configured with an electronics housing chamber, and the power plane may be configured within the electronics housing chamber so that the smooth side is facing the power plane.

The motor assembly may include an electronics module arranged between the power plane and the smooth side of the end-plate within the electronics housing chamber.

The external radial cooling fins of the end-plate may be configured on and about the intermediate portion substantially uniformly and equidistantly spaced from one another.

The external radial cooling fins of the end-plate may be configured on and about the peripheral portion uniformly and equidistantly spaced from one another.

Power Plane Embodiments

Apparatus, e.g., such as a motor assembly for driving a pump or rotary device, may include a power plane with a circular geometry to be mounted inside a space envelope having a similar circular geometry formed on an end-plate between an inner hub portion and a peripheral portion that extends circumferentially around the space envelope of the end-plate. The power plane may be a multi-layer circuit board or assembly having: a power layer with at least one higher temperature power module for providing power to a motor, a control layer with at least one lower temperature control electronics modules for controlling the power provided to the motor, and a thermal barrier and printed circuit board layer between the power layer and the control layer that provides electrical connection paths between the power modules of the power plane and the control electronics modules of the control layer, and also provides insulation between the power layer and the control layer.

Power plane embodiments may also include one or more of the following features: The power plane may be configured to do at least the following: allow the mounting of the at least one power module and the at least one control electronics modules on opposite sides of a thermal barrier, provide the electrical connection paths for interconnecting together the at least one power module and the at least one control electronics modules, as well as for interconnecting input/output power connections and the at least one power module and the at least one control electronics modules, and insulate and/or direct heat emitted from one or more of the at least one power module, the at least one control electronics modules and a shaft of the motor to the outer diameter of the power plane where there is a higher air flow.

The power plane may be configured as a doughnut shaped power plane printed circuit board or assembly in order to fit in the space envelope of the end-plate for providing a maximum space for mounting the power layer and the control layer, and to allow the shaft of the motor rotor to pass through to drive a cooling fan.

The power layer may be configured with higher temperature power modules; the control layer may be configured with lower temperature control electronic modules and components and power quality filter components; and the thermal barrier and printed circuit board layer may be configured from a material having a structural thickness and strength to mount the control layer on one side and the power layer on an opposite side, the material configured to provide insulation to reduce the transfer of heat between the power layer and the control layer.

The thermal barrier and printed circuit board layer may be constructed of a laminated material, including fiberglass, that provides structural strength and acts as an insulator for separating hotter power semiconductors of the power layer from cooler and sensitive control electronics and power quality capacitors of the control layer.

The power layer may include a circular power modules arrangement configured on one side of the thermal barrier and printed circuit board layer to couple to power plane low inductance input and integrated output connections, e.g., attached to an intermediate portion of the end-plate.

The at least one power module may include matrix converter power modules configured as part of a matrix converter to receive AC input signaling having an AC waveform with a voltage and frequency and provide converted AC signaling having a converted AC waveform with a converted voltage and frequency to drive the motor.

The control layer may include at least one power quality filter component configured to reduce the level of electrical noise and harmonic distortions.

The at least one power quality filter component may be attached directly onto the thermal barrier and printed circuit board layer and configured physically close or next to the matrix converter to reduce the amount of distortions emitted from matrix converter electronics in the matrix converter.

The at least one power module may include power semiconductor modules; the at least one control electronics module may include power quality capacitors; and the power plane may include low inductance and resistance inputs configured between the power semiconductor modules and the power quality capacitors in order to reduce switching stress and electromagnetic interference.

The power plane may include one or more compact power quality filters integrated therein.

The power plane may include a built-in power quality filter configured to produce minimal harmonic distortion, and protect the variable speed drive from most power quality abnormalities.

The power plane may be configured to combine both power and control circuits or circuitry into one integrated printed circuit board configuration for ease of assembly and compactness in size.

The power plane may include a combination of one or more of the following: current sensors, at least one gate driver, a power supply, a clamp circuit, power semi-conductor modules and power quality capacitors; and the electrical connection paths may be configured to interconnect input/output power connections and the combination of one or more of the current sensors, the at least one gate driver, the power supply, the clamp circuit, the power semi-conductor modules and the power quality capacitors.

The motor assembly may include the end-plate; the inner hub portion may be configured to receive the shaft of the motor rotor; and the peripheral portion may include heat fins configured to dissipate away from the end-plate heat generated by the at least one power module and the at least one control electronic module.

The motor assembly may include a motor casing configured to be utilized as a heat sink to allow a compact size and thermally optimized operation of the power plane.

The motor assembly may include, or takes the form of, a rotary device or pump, e.g., having the end-plate with the power plane arranged therein.

Advantage

Overall, the present invention provides a better way to increase the power density of variable frequency electronics and reduce the sensitivity of the electronics of a variable frequency drive to high temperatures for the purpose of installing the variable speed electronics inside a motor assembly; so as to eliminate or reduce substantially the improper operation or failure prematurely of such electronics of such a variable frequency drive if operated at their maximum rating.

BRIEF DESCRIPTION OF THE DRAWINGS

The drawing includes the following Figures, which are not necessarily drawn to scale:

FIG. 5A shows a motor assembly having labeled and identified a motor frame, a mid-plate, an end-plate, a terminal box and a fan; FIG. 5D shows an exploded view of a self-contained drive module assembly, e.g., all according to some embodiments of the present invention.

FIGS. 13A(1), 13A(2) and 13B show a mid-plate according to some embodiments of the present invention—including FIG. 13A(1) showing a perspective view of a motor side of the mid-plate, and FIG. 13A(2) showing a perspective view of a power plane side of the mid-plate shown in FIG. 3A(1), e.g., for configuring in the motor assembly shown in FIGS. 11 or 12A and 12B, according to some embodiments of the present invention.

FIGS. 14A-14B show an end-plate according to some embodiments of the present invention—including FIG. 14A showing a perspective view of a fan side of the end-plate, and FIG. 14B showing a perspective view of a mid-plate side of the end-plate shown in FIG. 14A, e.g., for configuring in the motor assembly device shown in FIGS. 11 or 12A and 12B, according to some embodiments of the present invention.

Figure 1:
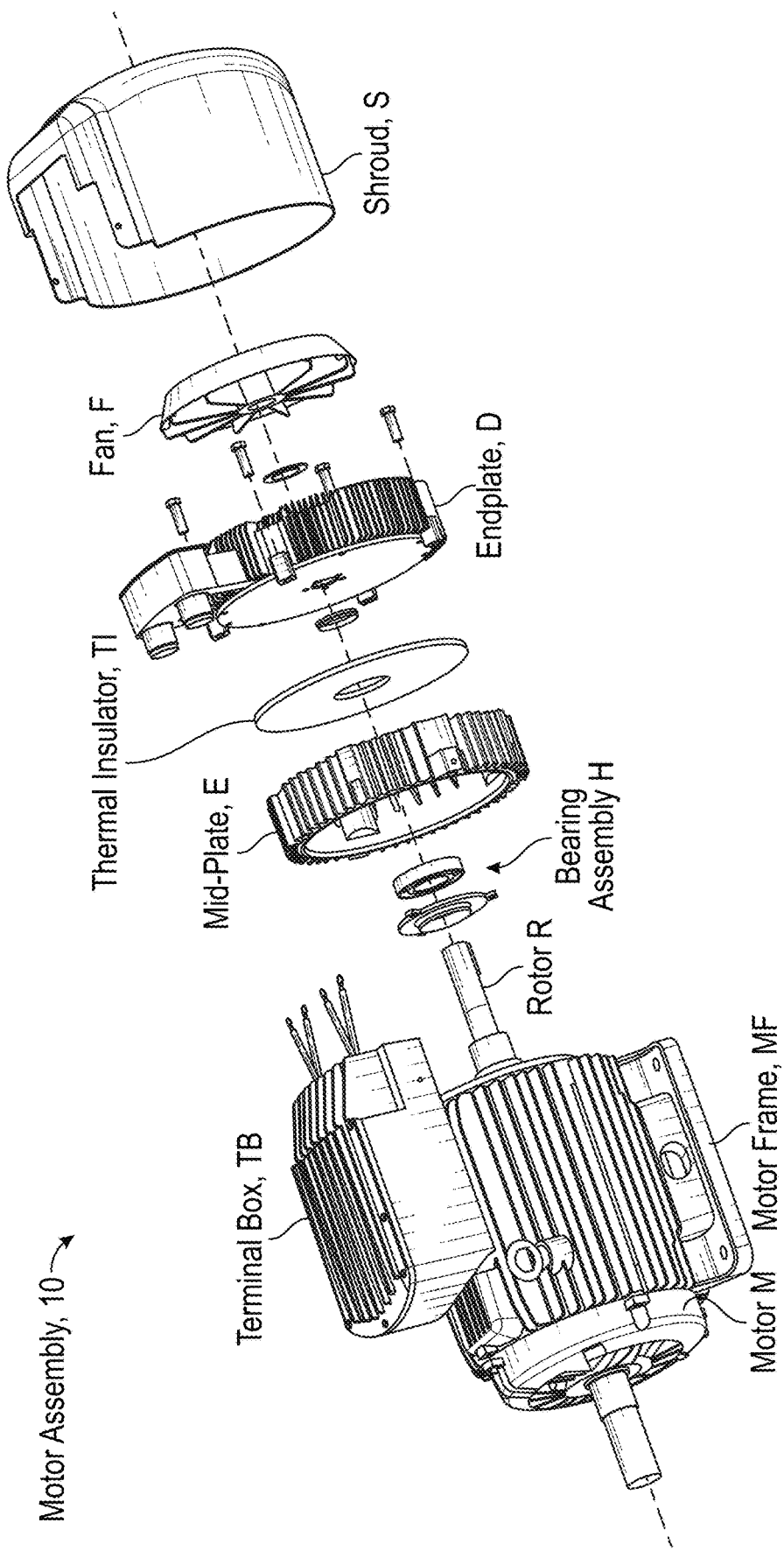
FIG. 1 is an exploded view of apparatus, e.g., in the form of a motor assembly for driving a pump or rotary device, according to some embodiments of the present invention.

The drawing includes examples of possible implementations; and the scope of the invention is not intended to be limited to the implementations shown therein. For example, the scope of the invention is intended to include, and embodiments are envisioned using, other implementations besides, or in addition to, that shown in the drawing, which may be configured within the spirit of the underlying invention disclosed in the present application as a whole.

DETAILED DESCRIPTION OF THE INVENTION

The Basic Apparatus 10

Figure 10A:
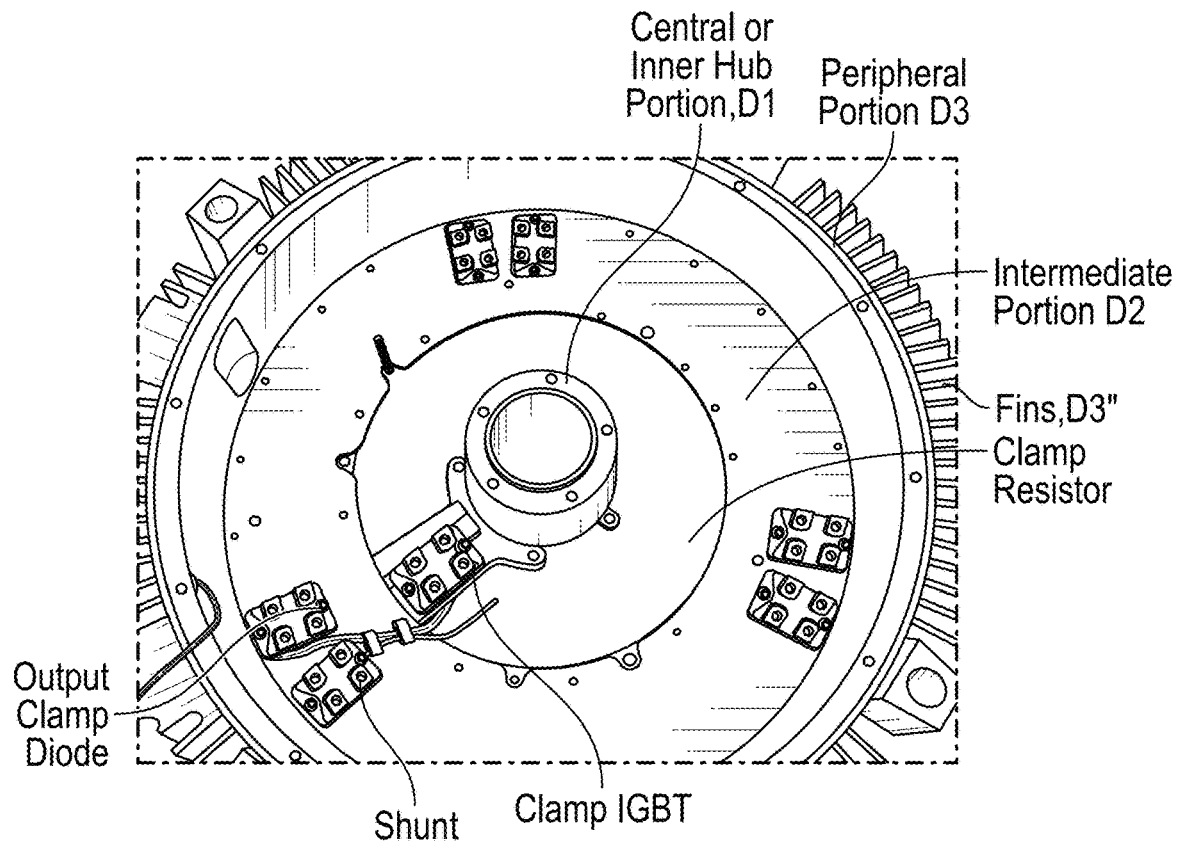
FIG. 10A shows an end-plate having an example of one possible clamp resistor implementation, according to some embodiments of the present invention.
Figure 10B:
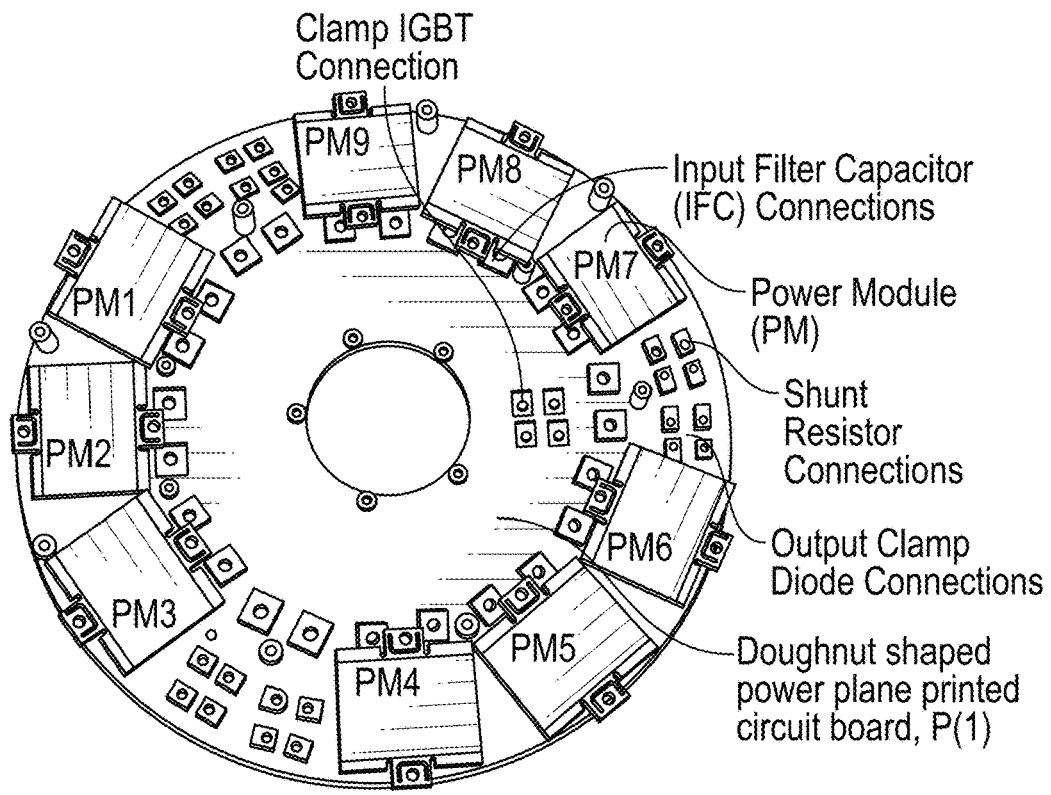
FIG. 10B shows a donut shaped power plane printed circuit board layer, e.g., including an example of connections to three shunt resistors and gate driver connections, according to some embodiments of the present invention.
Figure 11:
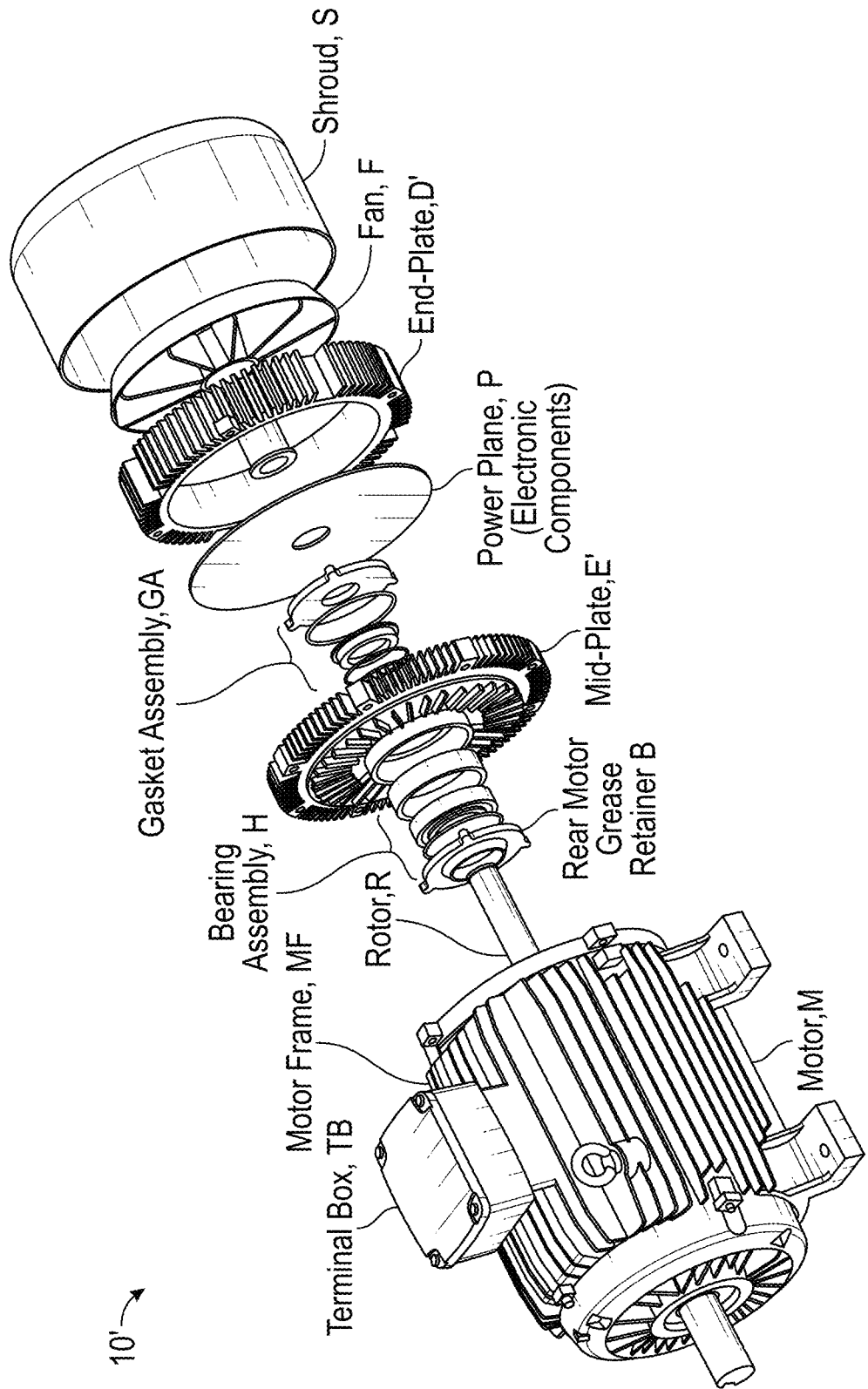
FIG. 11 is an exploded view of apparatus, e.g., in the form of a motor assembly for driving a pump or rotary device, according to some embodiments of the present invention.
Figure 12A:
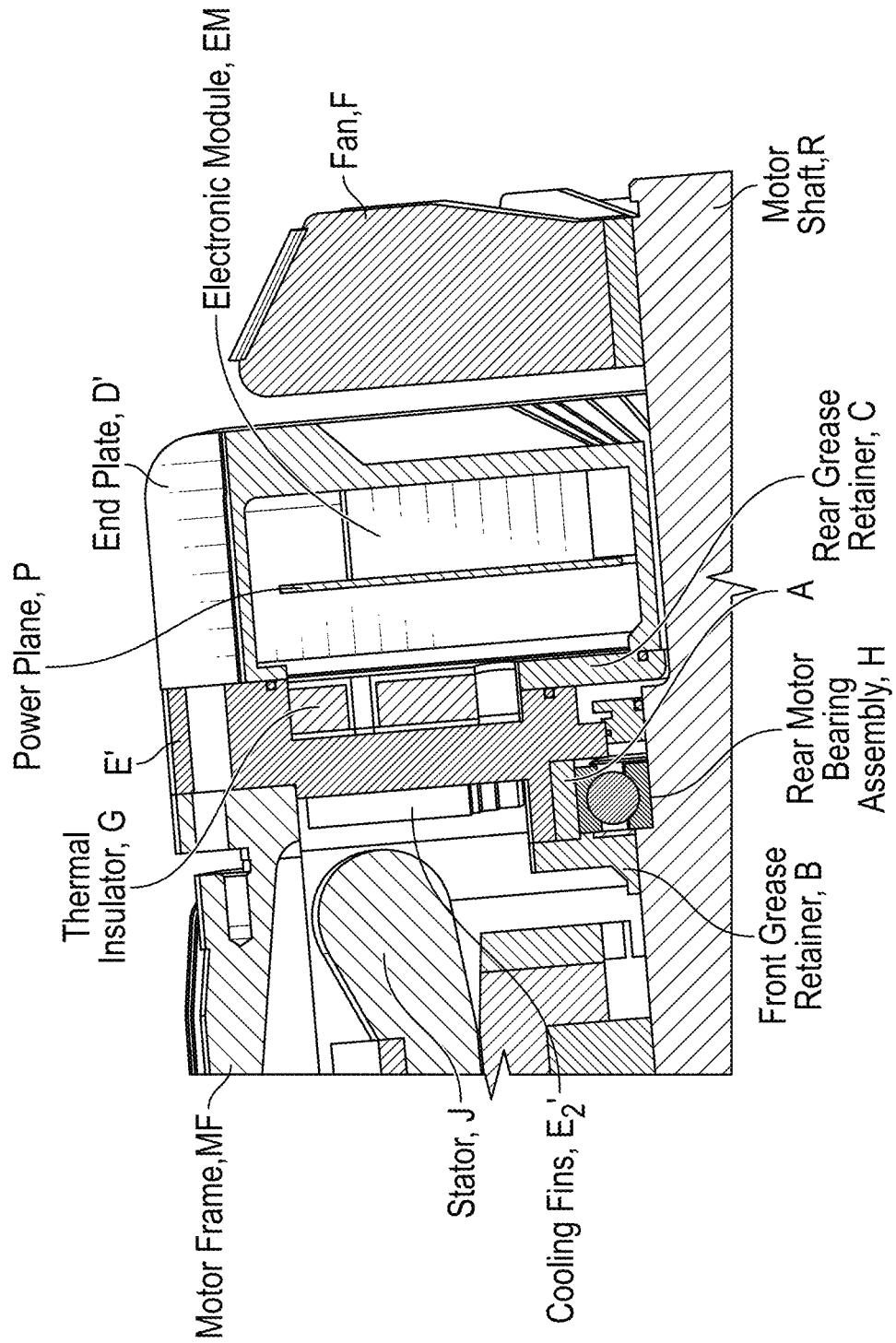
FIGS. 12A and 12B are cross-sectional views of part of a motor assembly, e.g., similar to or like that shown in FIG. 11.
Figure 12B:
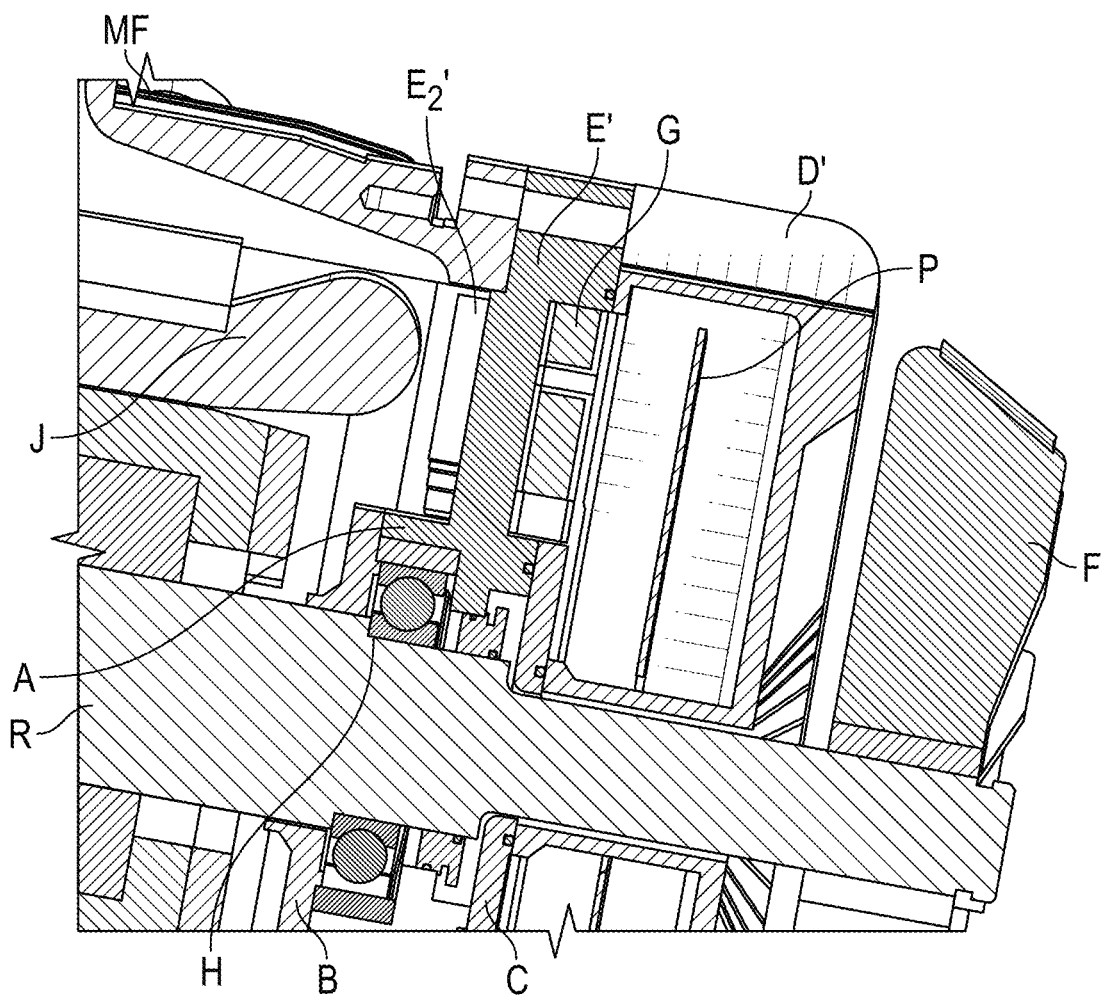

FIGS. 1 and 11 show an apparatus generally indicated as 10, 10', e.g., that may include, or take the form of, a motor assembly 10 for driving a pump or rotary device (not shown). The motor assembly 10 includes a motor M having a motor frame MF with a stator J (see FIG. 2A, 2B; 12A, 12B) arranged therein, a rotor R coupled to the motor M, a mid-plate E having a bearing housing flange portion A (see FIG. 2A, 2B; 12A, 12B), a rear motor bearing assembly generally indicated as H having a bearing assembly BA, front B and rear C grease retainers, a fan F, an integrated insulated layer G, a gasket assembly GA (FIG. 11), an end-plate D, a power plane P (FIG. 2A, 2B, 11, 12A, 12B) and a shroud S. The motor frame MF also includes a terminal box TB, e.g., as shown in FIGS. 1 and 11. The power plane P may be configured to include electronics, e.g., including a variable frequency drive, configured for controlling the operation of the motor M, which in turn is used for driving the pump or other rotary device. The power plane P is described in further detail, e.g., in relation to that shown in FIGS. 6A through 10B, as well as FIGS. 16, 17C, 18A and 18B.

By way of example, and according to some embodiments of the present invention, the motor assembly 10 may feature, or be configured with, a new and unique mid-plate E, end-plate D, or a combination thereof, e.g., consistent with that set forth below in relation to FIGS. 3A-4B.

Figure 3B:
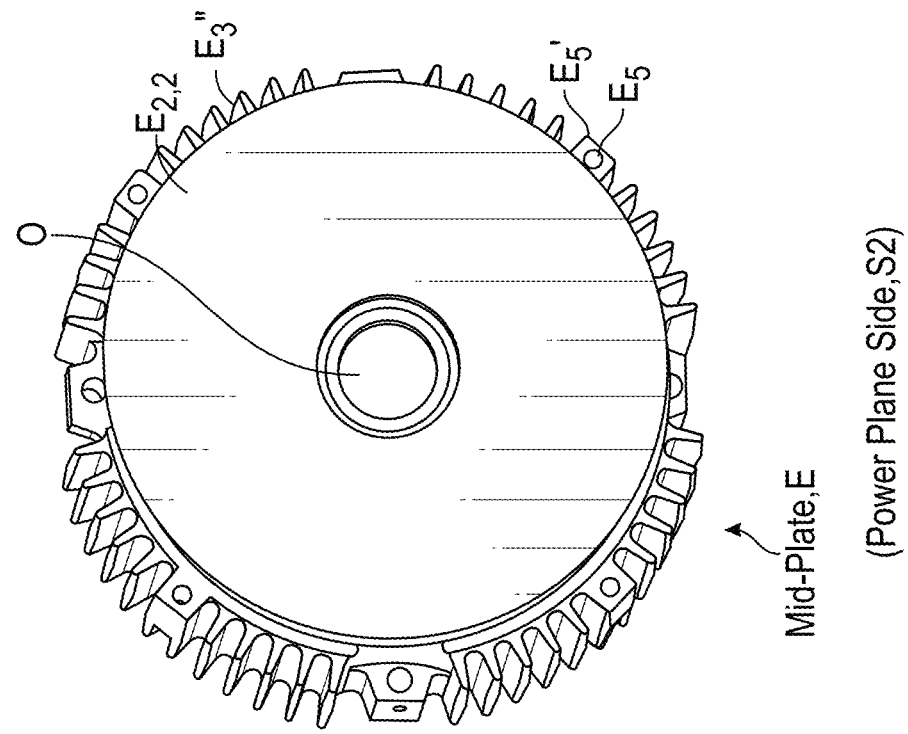
FIGS. 3A-3B show a mid-plate according to some embodiments of the present invention—including FIG. 3A showing a perspective view of a motor side of the mid-plate, and FIG. 3B showing a perspective view of a power plane side of the mid-plate shown in FIG. 3A, e.g., for configuring in the motor assembly shown in FIG. 1 or 2A-2B, according to some embodiments of the present invention.
Figure 3A:
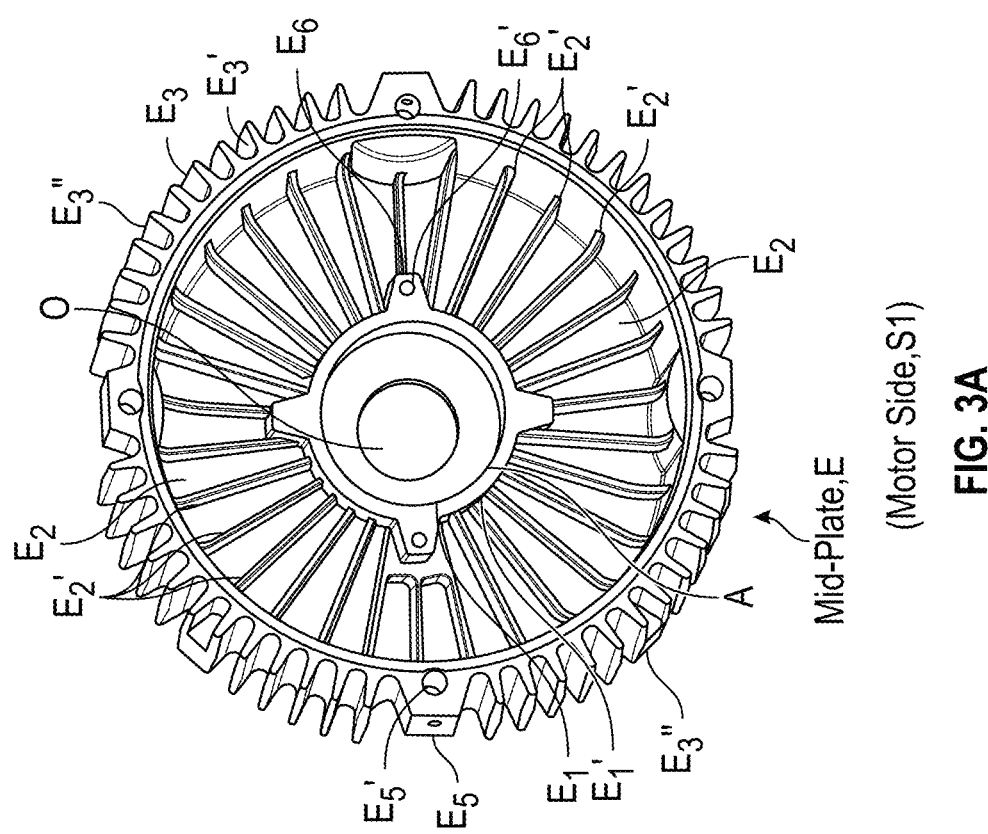

FIGS. 3A-3B and 13A(1)-13B: The Mid-Plate E

For example, FIGS. 3A-3B and 13A(1)-13B shows the mid-plate E, E', E'', each mid-plate having two sides $S_1$, $S_2$, including a motor side $S_1$ having a central portion $E_1$, an intermediate portion $E_2$, and a peripheral portion $E_3$.

The intermediate portion $E_2$ may be configured between the inner circumference $E_{1'}$ of the central portion $E_1$ and the peripheral portion $E_3$, consistent with that shown in 3A and 13A(1). The intermediate portion $E_2$ may include a multiplicity of internal radial cooling fins $E_{2'}$ extending from part of the inner circumference $E_{1'}$ of the central portion $E_1$ and diverging outwardly (e.g., away from one another) towards the peripheral portion $E_3$ to transfer heat from the central portion $E_1$ to the peripheral portion $E_3$ allowing for internal conduction heat capability.

The peripheral portion $E_3$ may include an outer circumferential surface $E_{3'}$ having a multiplicity of external radial cooling fins $E_{3''}$ diverging away from the peripheral portion $E_3$ to transfer the heat to surrounding air allowing for external convection heat capability.

The central portion $E_1$ may include the bearing housing flange portion A (see also FIGS. 1-2A, 2B; 11, 12A, 12B) configured to receive the motor bearing assembly H, and also configured with the opening O to receive and engage the rotor R. The motor assembly 10 may include a combination of the rotor R and the motor bearing assembly H (FIGS. 1-2A, 2B; 11, 12A, 12B) arranged on the rotor R.

FIG. 3B, 13A(2) shows a power plane side $S_2$ of the two side, e.g., that may be a smooth side having a corresponding intermediate portion $E_{2,2}$ with no cooling fins.

The motor assembly 10 may include the thermal insulator TI (FIG. 1), or the insulation layer G (FIGS. 12A-12B), arranged in relation to the mid-plate E and the end-plate D, and configured to reduce the rate of heat transfer, including all forms of heat transfer from conduction, convection and radiation.

Figure 13B:
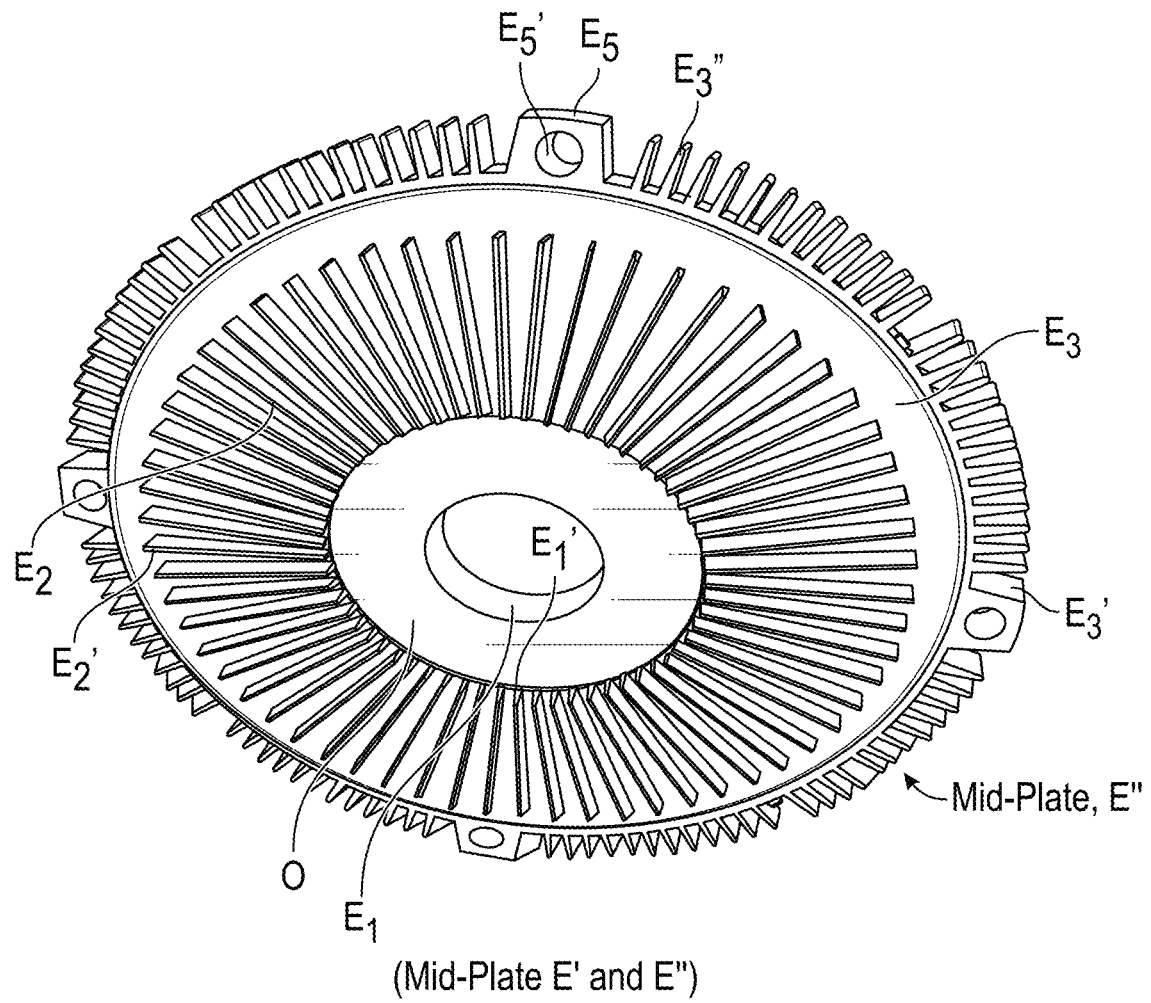
FIG. 13B showing a mid-plate, e.g., for configuring in the motor assembly shown in FIGS. 11 or 12A and 12B, according to some embodiments of the present invention.

FIG. 13B shows an alternative embodiment of a mid-plate generally indicated as E'''. Similar elements in FIGS. 13A, 13B are labeled with similar reference labels. By way of example, one difference between the mid-plates E' and E'' in FIGS. 13A, 13B respectively is that the mid-plate E' includes the bearing housing flange portion A, e.g., also shown in FIG. 3A, while the mid-plate E'' does not. Embodiments are envisioned, and the scope of the invention is intended to include, mid-plates having such a bearing housing flange portion A, as well as embodiments that do not.

Consistent with that shown in FIG. 3A, the internal radial cooling fins $E_{2'}$ may be configured on and about the intermediate portion $E_2$ substantially uniformly and equidistantly spaced from one another. The external radial cooling fins $E_{3''}$ may be configured on and about the peripheral portion $E_3$ substantially uniformly and equidistantly spaced from one another. By way of example, and consistent with that shown in FIGS. 3A-3B, the mid-plate E may be configured with more external radial cooling fins $E_{3''}$ than the internal radial cooling fins e.g., including than more than twice as many more. In FIG. 3A, the mid-plate E is shown with 30 (e.g. compare mid-plate E' in FIG. 13A(1) with 36) internal radial cooling fins $E_{2'}$ that are substantially uniformly and equidistantly spaced from one another. In FIG. 3A, the mid-plate E(1) is shown with 48 (e.g. compare mid-plate E' in FIG. 13A(1) with 94) external radial cooling fins $E_{3''}$ that are substantially uniformly and equidistantly spaced from one another. However, the scope of the embodiment is not intended to be limited to the number of the internal radial cooling fins $E_{2'}$, the number of the external radial cooling fins $E_{3''}$, or numerical relationship between the number of the internal radial cooling fins $E_{2'}$ and the number of the external radial cooling fins $E_{3''}$. For example, embodiments are envisioned, and the scope of the invention is intended to include, implementations in which the number of the internal radial cooling fins $E_{2'}$ and the number of the external radial cooling fins $E_{3''}$ is greater or less than that shown in FIGS. 3A-3B. Embodiments are also envisioned, and the scope of the invention is intended to include, implementations in which the numerical relationship between the number of the internal radial cooling fins $E_{2'}$ and the number of the external radial cooling fins $E_{3''}$ is different than that shown in FIGS. 3A-3B.

In FIGS. 3A-3B and 13A(1), the mid-plates E' and E" include other features that may not form part of the underlying invention per se, including outer retaining members $E_5$ configured with apertures $E_{5'}$ for receiving fasteners (not shown), e.g., to couple the mid-plates E' and E' to some other part of the motor assembly, such as the motor frame MF (FIGS. 1 and 11), as well as including two or three outer retaining members $E_6$ configured with apertures $E_{6'}$ for receiving fasteners (not shown), e.g., to couple the mid-plates E' and E" to some other part of the motor assembly, such as the motor frame MF (FIGS. 1 and 11).

In effect, the mid-plate embodiments according to the present invention set forth herein consist of a system having several highly engineered elements:

By way of example, the motor assembly 10 may be configured with a specially designed motor casing to improve thermal efficiency consisting of the following elements:

1) The mid-plate E, also called and known as a motor end-plate, may be made of copper, aluminum, or cast iron, with the rear motor bearing or bearing housing H incorporated into the mid-plate E. The mid-plate E may be optimized to conduct heat away from the pump's non-drive end bearing, the motor's stator S and rotor R, and insulate the electronics forming part of the power plane P at the same time. This innovative configuration according to the present invention would place the bearing housing flange portion A inside the mid-plate E or E' as shown in FIGS. 1 and 11, and as such, the mid-plate E or E' would effectively then become the structural support for the rotor R.
2) The special heat sink fins $E_{2''}$, $E_{3''}$ may be designed for low audible noise, and increased surface area, allowing for greater thermal efficiency.
3) Circular design unique geometry may be implemented to provide optimized space and ease of manufacturing.
4) Circular geometry may be implemented that allows for configuration of power electronic modules (FIGS. 1 and 11) and electronics (FIGS. 2 and 12A), which allows the rotor/shaft R to pass through to power the cooling fan F (FIGS. 1 and 11).

The mid-plate E or E' may include one or more of the following: The mid-plate E or E' may be configured for housing the rear motor bearing H; The mid-plate E or E' may be configured in relation to the power plane component P; The mid-plate E or E' may be configured or incorporated with bearing oil/grease tubes. The mid-plate E or E' may be configured so heat may be redirected radially versus axially. The mid-plate E or E' may also be configured to use the radial cooling fins $E_{2'}$ to redirect the heat from the motor end windings of the motor M to the peripheral portion or edges $E_3$ of the mid-plate E or E'. The mid-plate E or E' may be configured to provide thermal paths from the motor end windings to airflow on the outside of the stator J.

The mid-plate E or E' may be configured to provide a thermal path for the rotor R to the ambient through the bearing assembly H.

The mid-plate E or E' may be configured to create and provide the structural support for the rotor R.

The front B and rear C grease retainers may also be used in conjunction with the mid-plate E or E'.

An integrated insulation layer G on the outside of this mid-plate E or E' limits the heat flow from the mid-plate heat-sink to the power converter area and limits heat into the end-plate electronics area.

Minimized thermal contact may be implemented between the mid-plate E or E' and the end-plate D via an insulating gasket G that forms part of the gasket assembly GA.

Mid-Plate: Theory of Operation

The mid-plate E or E' is configured with a unique design that incorporates a circular geometry with internal and external heat sink fins $E_{2'}$, $E_{3''}$, e.g., consistent with that shown in FIGS. 1 and 11. The internal fins $E_{2'}$ are located along the inner circumference $E_{1'}$ of the mid-plate E or E', leaving space in the center for the rotor bearing housing H. The external fins $E_{3''}$ are spread across the entire outer diameter/circumference of the mid-plate E or E', allowing for external convection capability, e.g., consistent with that shown in FIGS. 1 and 11.

Figure 2A:
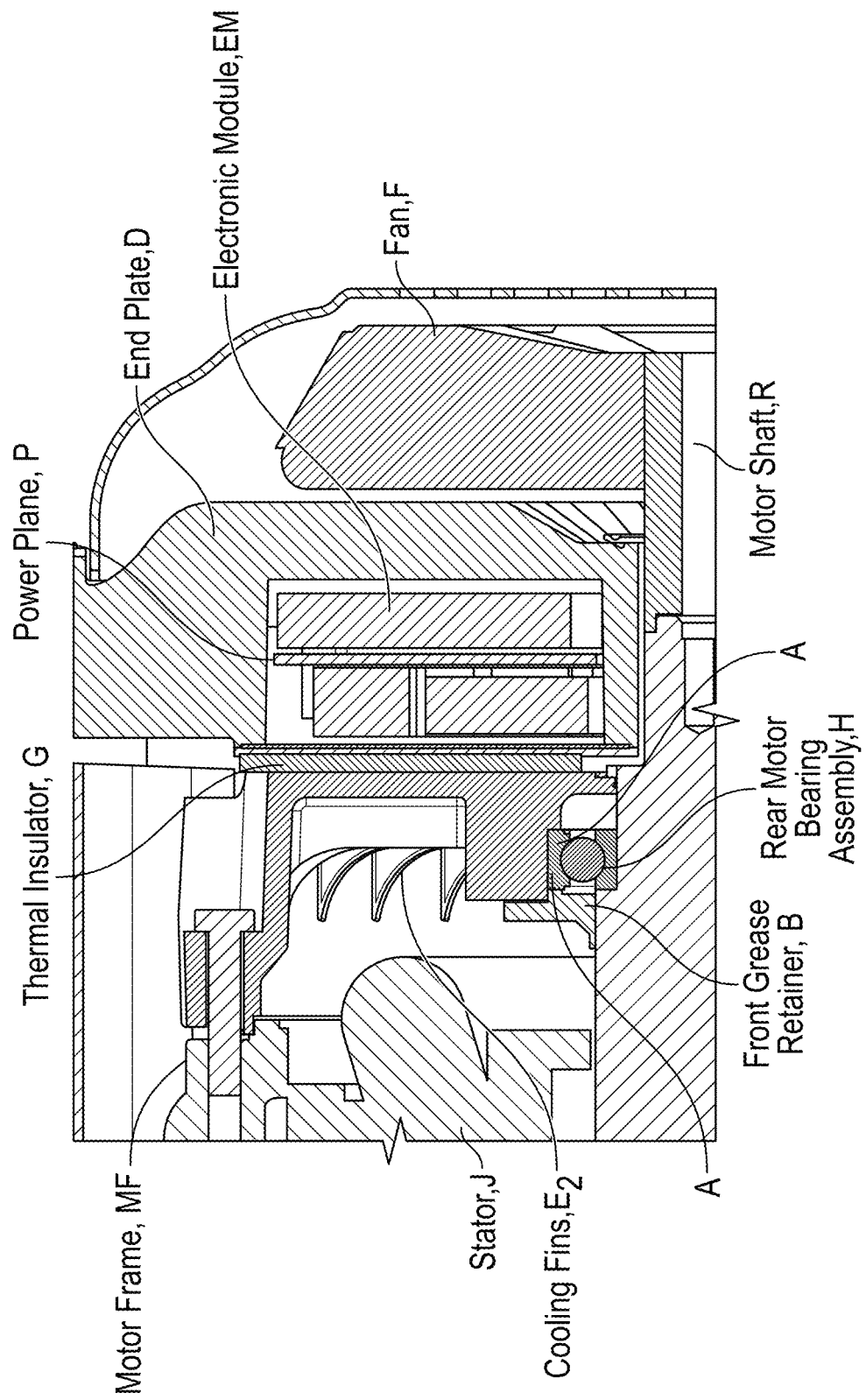
FIGS. 2A and 2B are cross-sectional views of part of a motor assembly, e.g., similar to or like that shown in FIG. 1.
Figure 2B:
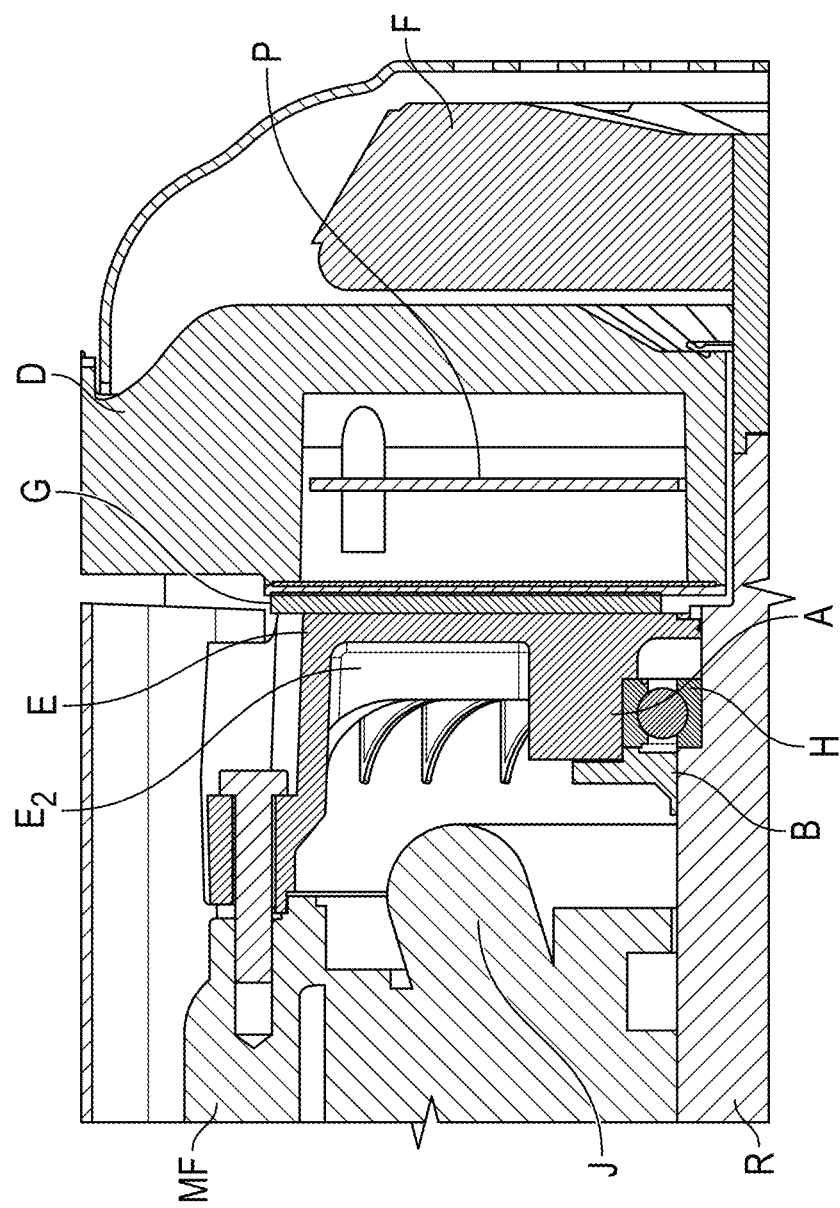

The mid-plate E or E' also features a thin insulation layer G on the electronics side of the mid-plate E, which is smooth and has no fins, e.g., as shown in FIGS. 2A-2B.

This thin insulation layer G will allow various configurations for power electronic modules and electronics while still allowing the shaft/rotor R to pass through to power the cooling fan F. The main function of this design is threefold. The mid-plate E or E' acts as a structural support for the motor M and the motor's rotor R, a heat sink for the non-drive end, and a thermal insulator for the electronics chamber, e.g., that forms part of the end-plate D.

Thermal conductors are usually made of metal, due to their higher levels of thermal conductivity and ability to absorb heat. Therefore, by way of example, the mid-plate E or E' may be made of either aluminum, copper, or cast-iron. These metals have higher levels of thermal conductivity, good structural rigidity and are cost effective as compared to other exotic materials.

In operation, the mid-plate E or E' achieves its function through conduction and convection, where conduction is understood to be the transfer of heat between solids that are in contact with each other, and where convection is understood to be the heat transfer between a solid and a fluid. Conduction will occur between the shaft/rotor R and the mid-plate E or E' thru the bearing housing H, while convection occurs between the heat sink fins $E_{2'}$, $E_{3''}$ and the air.

In operation, air cooled heat sinks, e.g., like element $E_{3'''}$ may act as cooling mechanisms. They conduct the heat from the object it is in contact with and transfer heat to the air through convection. To function properly, the heat sink has to be hotter than the ambient temperature and the surface area contact should be maximized to ensure efficient thermal transfer. In the context of the present motor casing design, the mid-plate E or E' will conduct the heat generated from the electrical and mechanical losses of the motor M to the outside ambient air.

The losses from the rotor R can be attributed to the electrical losses (e.g., resistive and eddy current) caused by current flow, e.g., through aluminum bars located in the rotor R. These losses cause the rotor R to release heat into the motor's air chamber as well as directly conduct into the shaft/rotor R. The mid-plate E or E' will absorb this heat both through conduction from the shaft/rotor R through the bearing assembly H into the mid-plate E or E', and via convection through the heat sink fins $E_{2'}$ or $E_{3'''}$ located in the motor's internal air chamber.

The purpose of the thermal insulator G is to reduce the rate of heat transfer between two solids/fluids. As a person skilled in the art would appreciate, insulators reduce all forms of heat transfer, which are, or may take the form of: conduction, convection, and radiation. Thermal insulators are usually made of material with high resistance to thermal conductivity, due to their ability to reject heat. Therefore, the insulation layer will be made of either mica, fiberglass, thermoplastic, or some inexpensive material with a low level of thermal conductivity and good structural rigidity.

This design is incorporated in the mid-plate E or E' through an additional layer that is attached to the mid-plate E or E', e.g., as shown in FIG. 2. This insulation layer G may be comprised of mica, or some other optimal insulator, that acts as a thermal insulator for the electronic components forming part of the power plane P. The insulation acts as a barrier from the losses coming from the motor M in order to redirect heat towards the heat sink fins $E_{2'}$ or $E_{3'''}$. The mid-plate E or E' also houses the bearing housing H, which in turn supports the rotor and motor shaft R.

The overall design of the mid-plate E or E' makes it a novel element serving a multitude of functions simultaneously. The mid-plate E mechanically supports the non-drive end of the motor M, and allows the rotor R to spin due to the attachment of the shaft bearing contained in the center of the mid-plate E or E'. The mid-plate E or E' efficiently conducts motor heat to the exterior of the motor body, allowing the motor M to run reliably at an efficient temperature. Thirdly, the insulator G insulates the electronics from the elevated motor temperature, and allows components to operate at temperatures below their maximum rating.

Advantages

Advantages of the present invention may include one or more of the following:
1) Allows for the manufacture of an embedded electronic motor drive (e.g., a variable frequency drive) in power levels greater than currently produced in the prior art.
2) Allows for the manufacture of a variable speed motor in the same footprint as current industrial motors at power levels greater than currently produced in the prior art.
3) Via both internal and external heat sink fins $E_{2'}$ or $E_{3'''}$, the mid-plate E provides a thermally conductive pathway for both the motor winding heat, and non-drive end bearing heat.
4) Via the integrated insulation, the mid-plate E or E' provides a barrier to prevent heat from the motor to pass through to the sensitive electronics.
5) Due to its compact size, the mid-plate E or E' allows, e.g., a matrix converter to be designed to be installed into hazardous locations containing corrosives, moisture, and Class 1, Division 2 hazardous locations, as well.

Figure 4A:
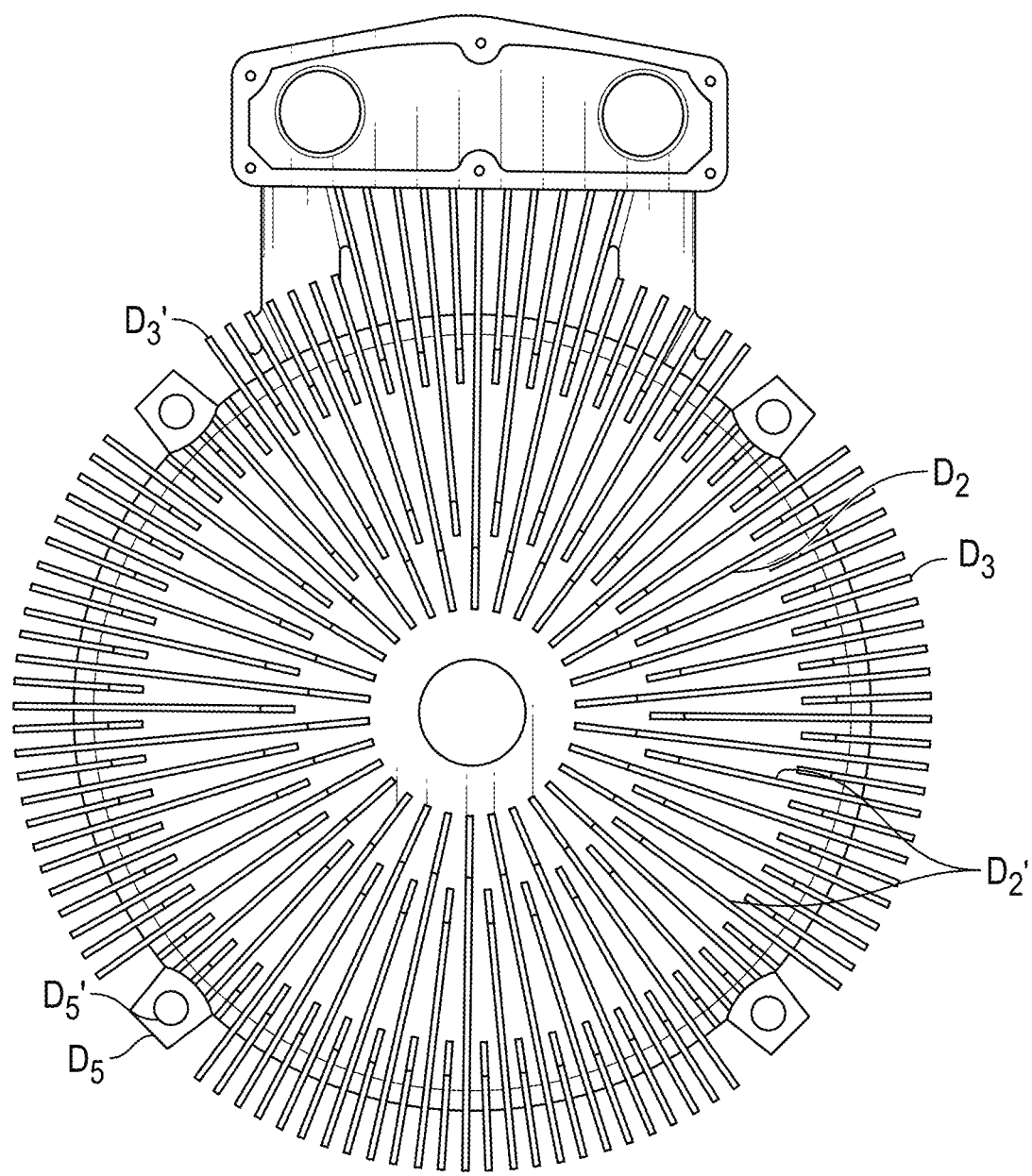
FIGS. 4A-4B show an end-plate according to some embodiments of the present invention—including FIG. 4A showing a perspective view of a fan side of the end-plate, and FIG. 4B showing a perspective view of a mid-plate side of the end-plate shown in FIG. 4A, e.g., for configuring in the motor assembly shown in FIG. 1 or 2A-2B, according to some embodiments of the present invention.
Figure 4B:
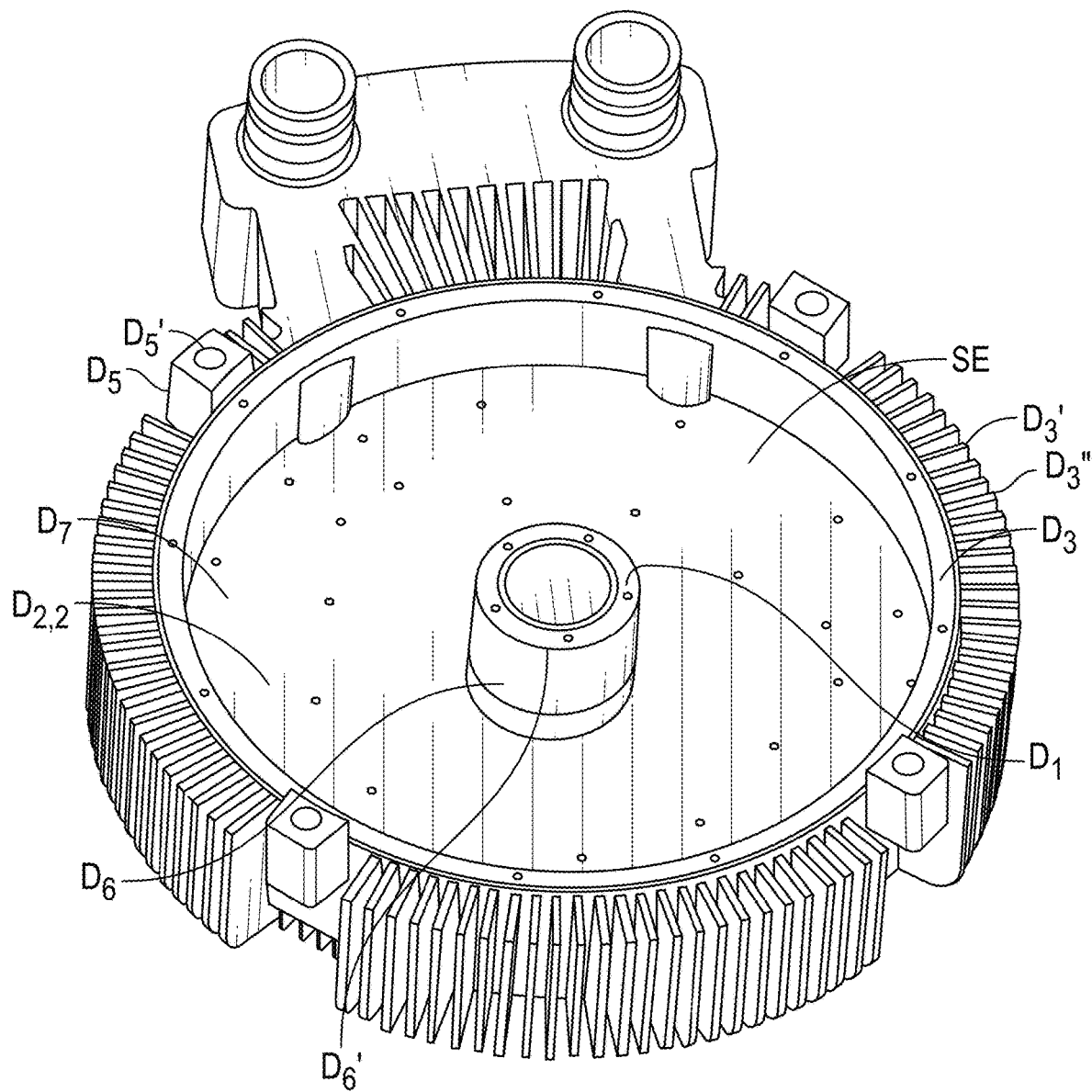

FIGS. 4A-4B and 14: The End-Plate D, D'

FIGS. 4A-4B shows the at least one plate in the form of an end-plate D, D' having two sides, a fan side FS having a central portion $D_1$, an intermediate portion $D_2$, a peripheral portion $D_3$.

The central portion $D_1$ may be configured with an opening O to receive and arrange the end-plate D, D' in relation to the rotor R (FIGS. 1 and 11).

The intermediate portion $D_2$ may be configured between an inner circumference $D_{1'}$ of the central portion $D_1$ and the peripheral portion $D_3$. The intermediate portion $D_2$ may include internal radial cooling fins $D_{2'}$ extending from the inner circumference $D_{1'}$ of the central portion $D_1$ and diverging outwardly towards the peripheral portion $D_3$ to transfer heat from the central portion $D_1$ to the peripheral portion $D_3$ allowing for internal conduction heat capability.

The peripheral portion $D_3$ may include an outer circumferential surface $D_{3'}$ (best shown as indicated in FIGS. 4B and 14B) having external radial cooling fins $D_{3'''}$ diverging outwardly away from the end-plate D to transfer the heat to surrounding air allowing for external convection heat capability.

FIGS. 4B and 14B show a mid-plate side MPS of the two side, e.g., that may be a smooth side having a corresponding intermediate portion $D_{2,2}$ with no cooling fins.

The power plane P may include electrical components, including electronics of a variable frequency drive, and the end-plate D, D' may be configured so that the smooth side MPS is facing the power plane P, e.g., as shown in FIG. 2A. The electronics module EM may be arranged between the power plane P and the smooth side MPS, e.g., as shown in FIG. 2A.

Figure 14A:
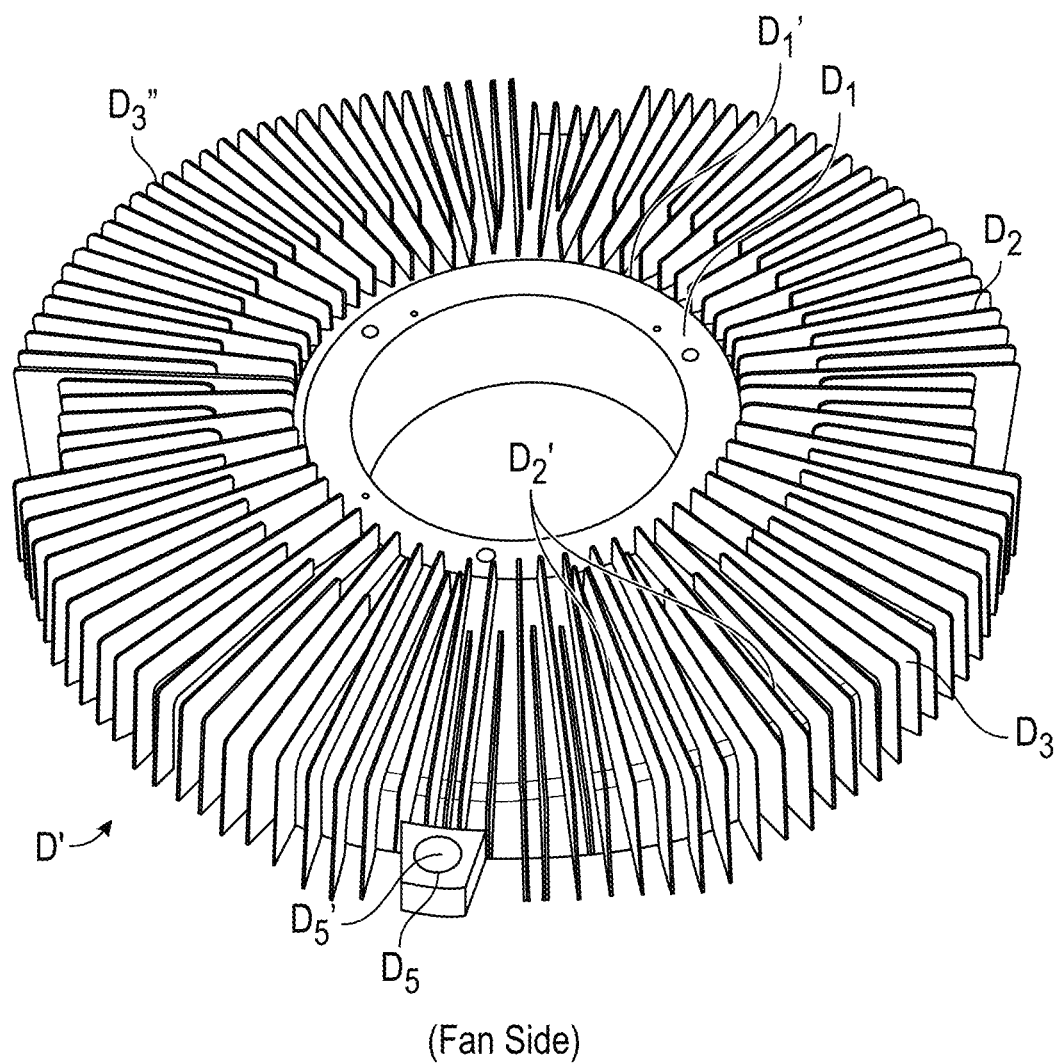

Consistent with that shown in FIGS. 4A and 14, the internal radial cooling fins $D_{2'}$ may be configured on and about the intermediate portion $D_2$ substantially uniformly and equidistantly spaced from one another. The external radial cooling fins $D_{3'''}$ may be configured on and about the peripheral portion $E_3$ substantially uniformly and equidistantly spaced from one another. By way of example, and consistent with that shown in FIG. 4A, the end-plate D, D' may be configured so that the internal radial cooling fins $D_{2'}$ extend and diverge outwardly towards and connect to the external radial cooling fins $D_{3'''}$, as shown in FIGS. 4A and 14A. However, the scope of the embodiment is not intended to be limited to the number of the internal radial cooling fins $D_{2'}$, the number of the external radial cooling fins $D_{3'''}$, or the numerical or physical relationship between the internal radial cooling fins $D_{2'}$ and the external radial cooling fins $D_{3'''}$. For example, embodiments are envisioned, and the scope of the invention is intended to include, implementations in which the number of the internal radial cooling fins $D_{2'}$ and the number of the external radial cooling fins $D_{3'''}$ is greater or less than that shown in FIGS. 4A-4B and 14A. Embodiments are also envisioned, and the scope of the invention is intended to include, implementations in which the physical relationship between the internal radial cooling fins $D_{2'}$ and the external radial cooling fins $D_{3'''}$ is different than that shown in FIGS. 4A-4B and 14A-14B, e.g., including where the internal radial cooling fins $D_{2'}$ and the external radial cooling fins $D_{3''}$ are not connected, as well as where the number of the internal radial cooling fins $D_{2'}$ is greater or less than the number of the external radial cooling fins $D_{3''}$, when compared to that shown in FIGS. 4A and 14A.

In FIGS. 4A-4B and 14A-14B, the end-plate D, D' may include other features that may not form part of the underlying invention per se, including outer retaining members $D_5$ configured with apertures $D_{5'}$ for receiving fasteners (not shown), e.g., to couple the end-plates D, D' to some other part of the motor assembly, such as the motor frame MF (FIGS. 1 and 11), as well as including two or three outer retaining members $D_6$ configured with apertures $D_{6'}$ for receiving fasteners (not shown), e.g., to couple the end-plates D, D' to some other part of the motor assembly, such as the motor frame MF (FIGS. 1 and 11).

In addition to that set forth above, and by way of further example, the several other highly engineered elements of the motor assembly 10 may also include the end-plate D, D'; and the specially designed motor casing to contain electronics and improve thermal efficiency may also include: The motor end-plate D, D', e.g., may be made of a metal such as aluminum. The end-plate D, D' may be optimized to conduct heat away from the electronics P and/or EM contained inside of the end-plate envelope, e.g., by having an insulating gasket GA to minimize thermal contact between the mid-plate E and the end-plate D, D'.

Special heat sink fins $D_{2'}$, $D_{3''}$ may be designed for low audible noise and increased surface area, allowing for greater thermal efficiency.

Circular designed unique geometry may be implemented to provide optimized space and ease of manufacturing.

Circular geometry may be implemented that allows for a configuration of power electronic modules and electronics (FIGS. 2A-2B and 17C) that allows the shaft R to pass through to power the cooling fan F.

End-Plate: Theory of Operation

The design of the end-plate D, D' incorporates a circular geometry, which consists of forming an electronics housing chamber generally indicated as $D_7$ on the mid-plate side and heat sink fins $D_{2'}$, $D_{3''}$ on the fan side of the end-plate D. (As shown in FIG. 4B, the electronics housing chamber $D_7$ is formed a s a hollowed out intermediate portion between the central portion $D_1$ and the peripheral portion $D_3$ of the end-plate D, D'.) This design allows electronic components P, EM (FIGS. 2A-2B) to be contained inside the electronics housing chamber $D_7$ of the end-plate D and provides ample cooling due to the heat sink fins $D_{2'}$, $D_{3''}$. The electronics housing chamber $D_7$ is integrated on one smooth mid-plate side of the end-plate D, D', where the inner diameter is hollowed as shown in FIG. 4B to allow room for power electronic modules and printed circuit boards to be installed. The heat sink fins $D_{2'}$, $D_{3''}$ are formed on the fan side of the end-plate D, D' in a radial arrangement extending from the motor shaft center or central portion $D_1$, extending outward and across the outer axial surface. The heat sink fins $D_{2'}$, $D_{3''}$ share the same basic pattern as those built on the bearing supporting plate called the "mid-plate" E, E'. (FIGS. 3A-3B and 13). The end-plate D, D' also has room in the center to allow the shaft/rotor R to pass through in order to power the cooling fan F (FIGS. 1-2B). The function of the end-plate D, D' is twofold: to act as a heat sink for the waste heat emitting from the electronics, and a sealed enclosure to allow the electronic components a place to be mounted and protected from harsh environments.

The end-plate D, D' functions through both conduction and convection. As a person skilled in the art would appreciate, and consistent with that set forth above, conduction is the transfer of heat between solids that are in contact with each other, and convection is the heat transfer between a solid and a fluid. Conduction will occur due to the power modules, e.g. EM, mounted to the inner face of the end-plate D, D'. The electronic printed circuit boards, and components will produce waste heat while in operation. This heat will be absorbed by the end-plate's heat sink characteristic. All heat will then be released by convection through the fins $D_{2'}$, $D_{3''}$ and cooling fan F. Convection will mainly occur between the heat sink fins $D_{2'}$, $D_{3''}$ and ambient air.

As a thermal conductor, this design may work best when constructed of metal. This is due to their higher levels of thermal conductivity and ability to absorb heat. Therefore, the end-plate D, D' will typically be made of a metal like aluminum. By way of example, this material was chosen for its structural rigidity, ability to conduct heat extremely well, and cost effectiveness over other considerations, although the scope of the invention is intended to include other types or kind of metals either now known or later developed in the future.

The end-plate D, D' may be mounted between the mid-plate E, E' and the cooling fan F, as shown in FIGS. 1-2B and 5A-5D. Thermal contact between the mid-plate E, E' and the end-plate D, D' is limited through the thermal insulator G, as shown in FIGS. 2A-2B. This shields the electronics from waste heat coming from the motor and bearing. The end-plate D, D' as a whole acts as an enclosure for the components and protects them from both harsh environments and excessive heat.

In addition to shielding the electronics from heat, this design is also be able to expel that heat into the ambient air and maintain viable operating temperatures. This function is achieved by both the heat sink fins $D_{2'}$, $D_{3''}$ and the cooling fan F. Since the fins $D_{2'}$, $D_{3''}$ are spread along the vast surface area of the end-plate D, D'; they have the ability to conduct heat from the power modules, and air chamber to the outside of the end-plate chamber. Once outside the end-plate chamber, the heat is removed by convection. The cooling fan F provides proper airflow over the entire surface of the metal (e.g., aluminum) fins of the end-plate D, D' and aids in maintaining the temperature of the components below their maximum rating.

Heat sinks act $D_{2'}$, $D_{3''}$ as cooling mechanisms. They conduct the heat from the object it is in contact with and transfer heat to the air through convection. To function properly, the heat sink fin $D_{2'}$, $D_{3''}$ has to be hotter than the ambient temperature and the surface area contact should be maximized to ensure efficient thermal transfer. In terms of the end-plate D, D', it will absorb the heat generated from both the power modules and the air chamber of the variable frequency drive (VFD) and transfer it to the outside ambient air.

Overall, the design of the end-plate D, D' allows it to serve multiple functions during operation. First, it provides a protective enclosure to contain all of the electronics. Second, it acts as a heat sink to remove heat generated by the losses in the components, thereby protecting the components from excessive temperatures. The unique geometry of the end-plate D, D' allows these components to be placed in the same envelope as a standard electric motor rated for normally hazardous areas. Lastly, the heat sink fins $D_{2'}$, $D_{3''}$ and cooling fan F aid in handling heat distribution throughout the end-plate D, D'. With all of these features, the end-plate D, D' allows the electronics to run smoothly during operation and maintain their temperature below the maximum rating.

Advantages

The advantages of this invention may include the following:

Via external heat sink fins $D_{2'}$, $D_{3'''}$, the end-plate D, D' provides a thermally conductive pathway for the power module heat.

Allows for the electronic variable speed drive to be contained within the footprint of a current electric motor M.

Due to the compact size, it allows the power electronics to be installed into hazardous locations containing corrosives or moisture Allows for the manufacture of an embedded electronic motor drive in power levels greater than currently produced The power electronics will be housed in the motor end-plate D, D' and sealed between the mid-plate E, E'.

The end-plate D, D' design will permit easy removal from motor and easy disconnect of power and communication connections.

The combined end-plate/mid-plate design shall have IP66 protection. All wiring/cable pass through to be sealed, static seals at mid-plate E to motor M, end-plate D, D' to mid-plate E, E', end-plate power electronics to be sealed at the outside diameter (OD) and the inside diameter (ID). Dynamic seal at shaft/mid-plate.

FIG. 5A to 5D

Figure 5B:
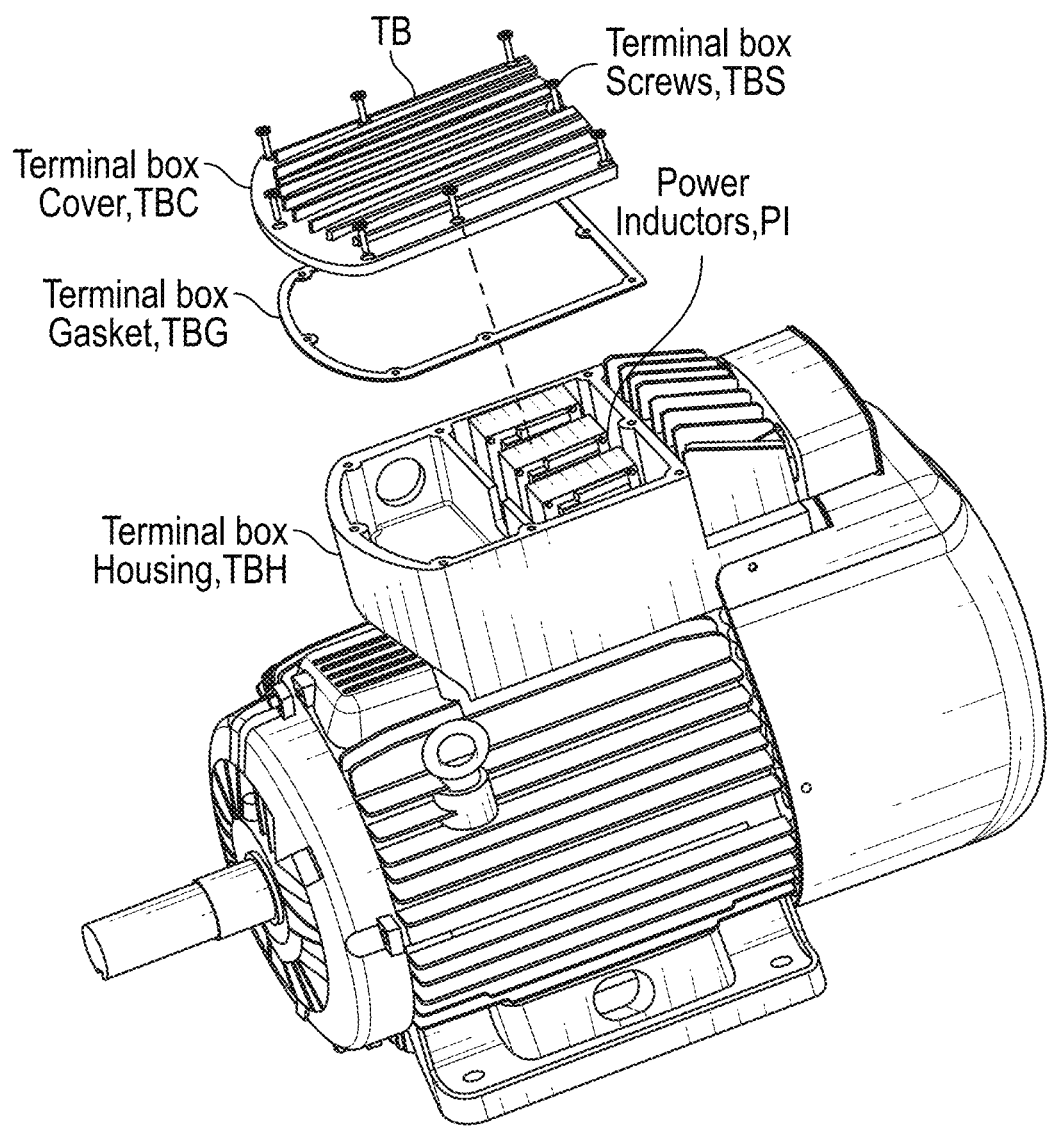
FIG. 5B shows a prospective view of a motor assembly that includes a partial exploded view of the terminal box.

FIGS. 5A and 5B shows the motor assembly 10 having the main terminal box TB arranged thereon, which provides a sealed junction point for the motor, the motor drive, the drive interface and external power wiring, as well as a terminal box housing having power inductors PI arranged therein, as shown. The main terminal box TB includes a terminal box cover TBC, a terminal box gasket TBG, and terminal box screws for affixing the terminal box cover on the terminal box housing TBH.

Figure 5C:
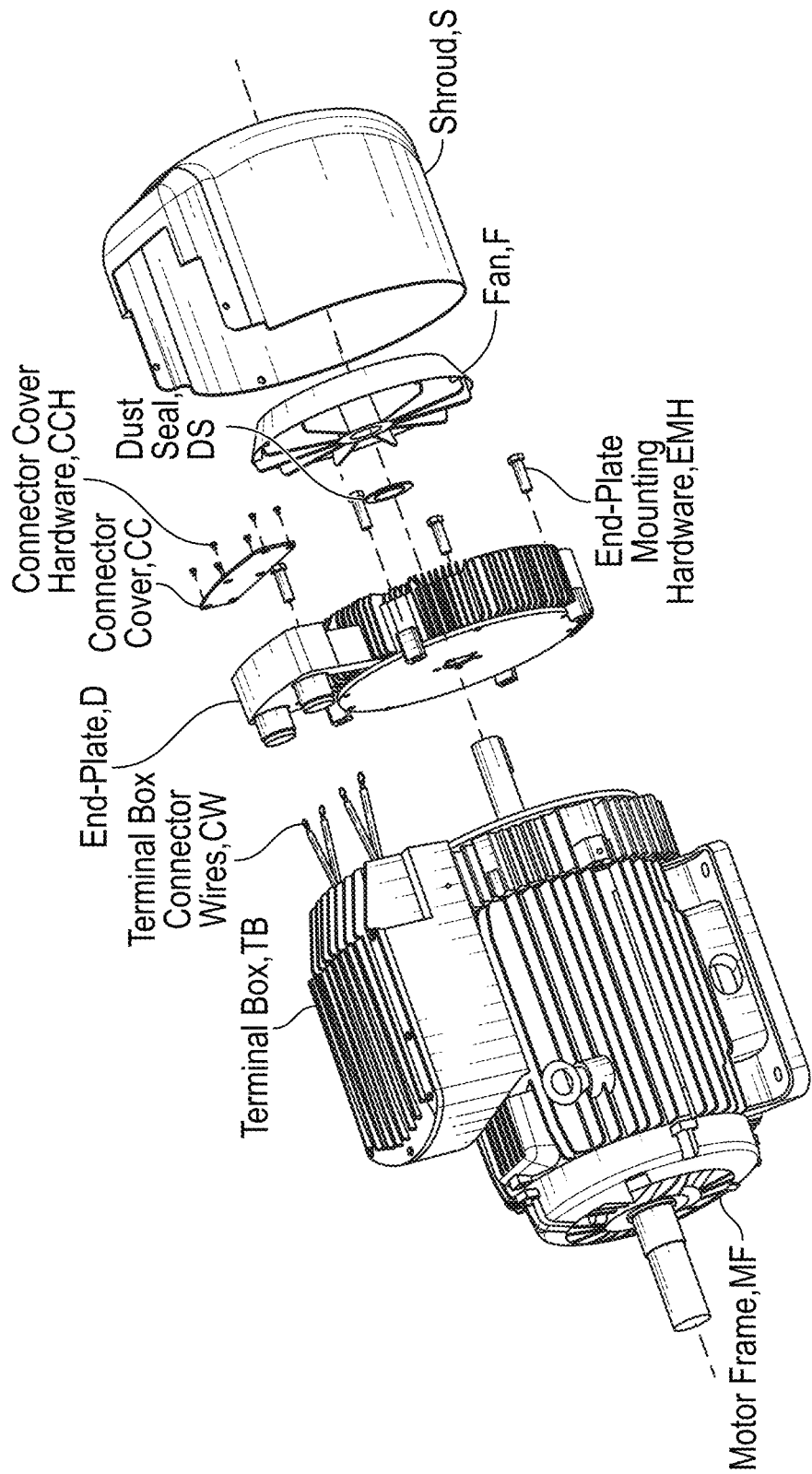
FIG. 5C shows a prospective view of a motor assembly that includes a partial exploded view of a motor and mid-plate combination, an end-plate, a fan and a shroud.

FIG. 5C shows the motor assembly in an exploded view, which illustrates the simplicity of the end-plate's (D) electrical and mechanical connection to the motor frame (MF). FIG. 5C also shows that the end-plate (D) is a complete self-contained drive module as shown in 5D, which provides portability to service in a suitable environment or for a quick replacement to a new end-plate (D) drive module, if the old end-plate breaks down, which affords the overall motor assembly design a 'Plug and Play" style that is unique to the motor assembly art. by way of example, FIG. 5C shows terminal box connector wires CW (e.g., which can be more or less wires than that specifically shown), a connector cover CC, a connector hardware CH, a dust seal DS and end-plate mounting hardware MH.

FIG. 5D shows the self-contained drive module assembly, e.g., which includes the end-plate D, the terminal box TB, wire channels WC, the connector cover CC, the connector cover hardware CCH, an electronics module EM (see also FIGS. 7 and 10B), the end-plate cover gasket/insulator GI, the end-plate cover EC and end-plate cover hardware ECH.

In summary, consistent with that shown in FIGS. 5C and 5D, the process for disassembly the end-plate D is as follows:

1) remove the shroud hardware (not shown) and the shroud S (FIG. 5C),
2) remove fan set screw/hardware (not shown) and the fan F (FIG. 5C),
3) remove the connector cover hardware CCH and connector cover CC,
4) disconnect the end-plate connector (not shown) from terminal box connector wires TBCW,
5) remove the end-plate mounting hardware ECH and the self-contained drive end-plate(D) module EM. The self-contained drive end-plate(D) module EM can be replaced and the end-plate D can be reassembled using the same steps.

FIGS. 6A-10B: The Power Plane P

According to some embodiments, the present invention disclosed herein may consist of a system or apparatus, e.g., having, or in the form of, the power plane P configured for providing power and control functionality, e.g., for operating the motor assembly in order to drive a pump or rotary device. The power plane P features several highly engineered elements, as follows:

By way of example, the power plane P may have a circular geometry to be mounted inside a space envelope SE (FIGS. 5D and 9B) having a similar circular geometry formed on the end-plate D, D' (e.g., see FIGS. 1, 4A-4B, 9A-9B, 11, 14A-14B) between the inner hub portion $D_1$ and the peripheral portion $D_3$ that extends circumferentially around the space envelope SE (aka the electronics housing chamber $D_7$ (see FIGS. 4B, 5D and 14B)) of the end-plate D, D'. The power plane P may be a multi-layer circuit board or assembly, e.g., having: a power layer, a control layer and a thermal barrier and printed circuit board layer P(1). The power layer includes higher temperature power modules like circular power modules P/CM (e.g., see FIG. 17C) for providing power to the motor M, e.g., of the pump or rotary device. The control layer includes lower temperature control electronics modules like power quality filter capacitors IFC (e.g., see FIG. 17C) for controlling the power provided to the motor M. The thermal barrier and printed circuit board layer P(1) in FIG. 10B in configured between the power layer and the control layer and provides electrical connection paths between the power modules of the power plane and the control electronics modules of the control layer, and also provides thermal insulation between the power layer and the control layer.

Figure 7:
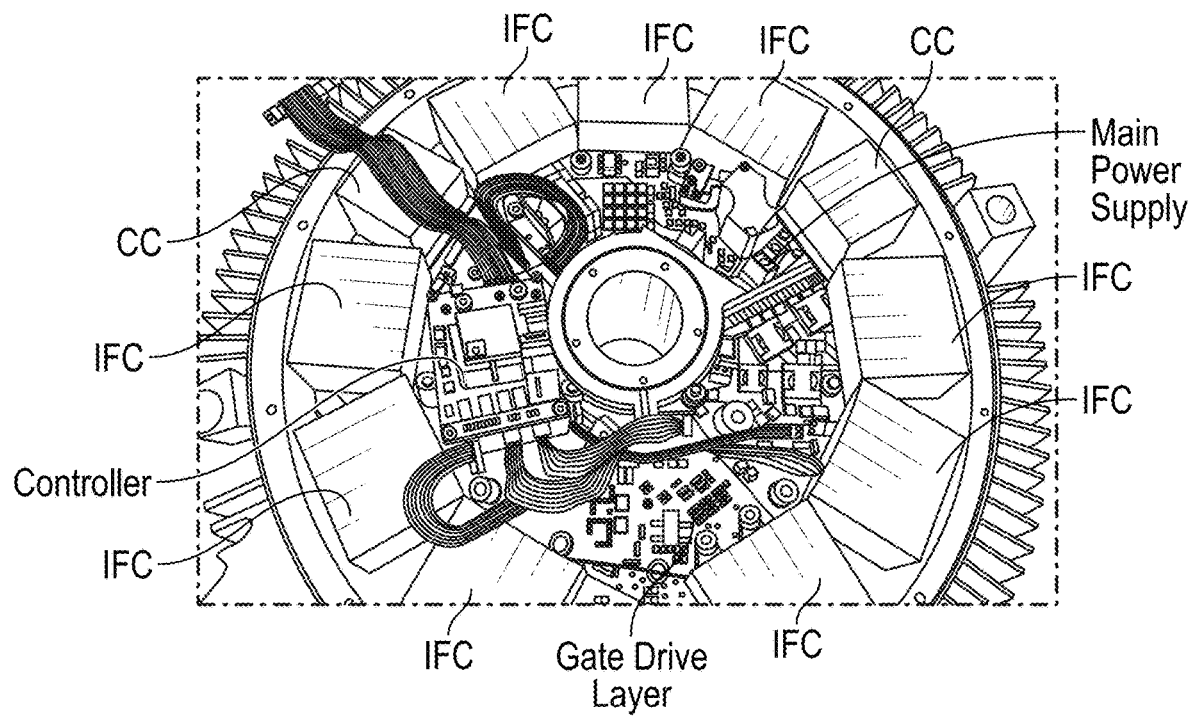
FIG. 7 shows a photograph of a motor end-plate having a power plane with a matrix converter arranged therein, e.g., configured with an example of a main power supply, a controller, a gate drive layer, clamp capacitors (CC) and input filter capacitors (IFC), according to some embodiments of the present invention.
Figure 9B:
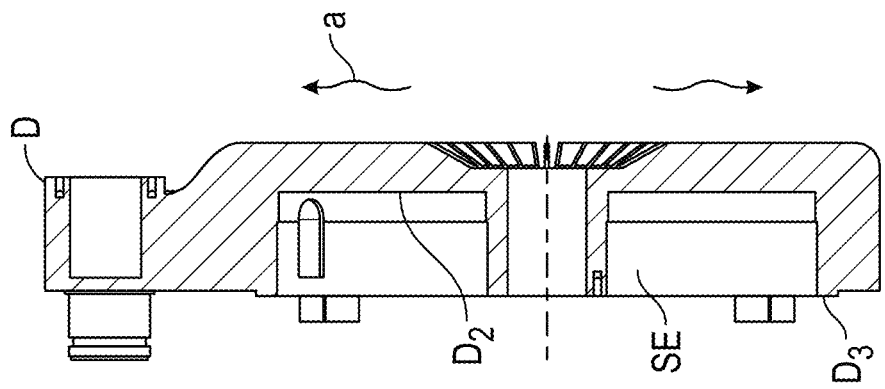
FIG. 9B shows a diagram of a side cross-sectional view of the end-plate in FIG. 9A having corresponding arrows representing heat flowing away from the inner hub portion and towards the peripheral portion of the end-plate, when operating according to some embodiments of the present invention.
Figure 9A:
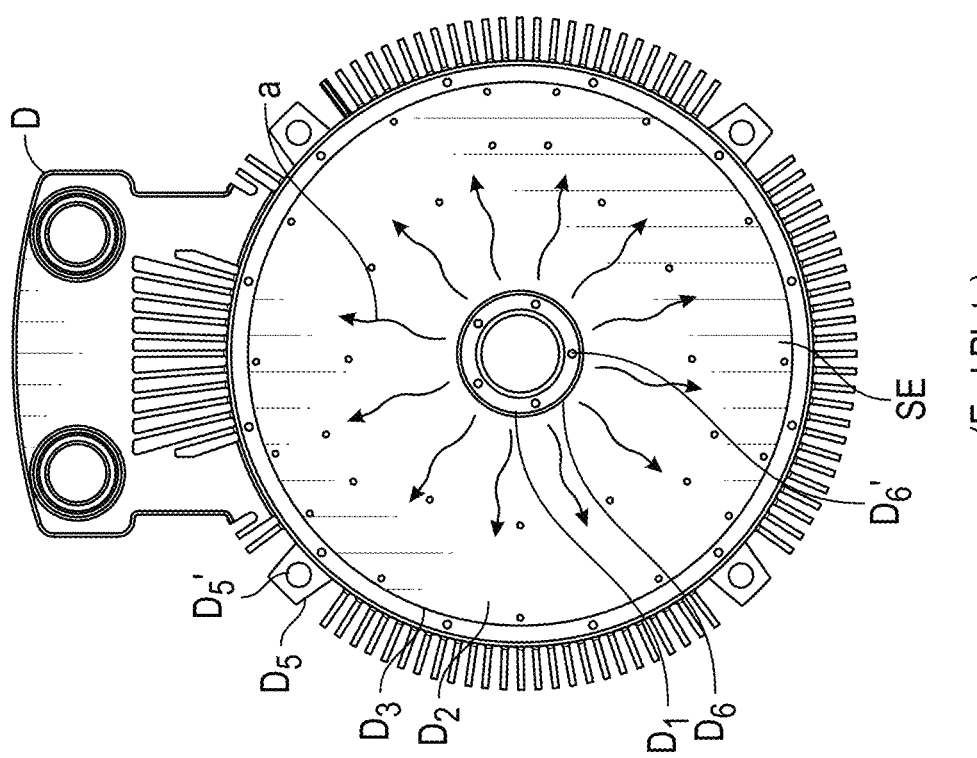
FIG. 9A shows a diagram of a top view of an end-plate having a space envelope formed therein between an inner hub portion and a peripheral portion, that includes arrows representing heat flowing away from the inner hub portion and towards the peripheral portion, e.g., when operating according to some embodiments of the present invention.
Figure 17A:
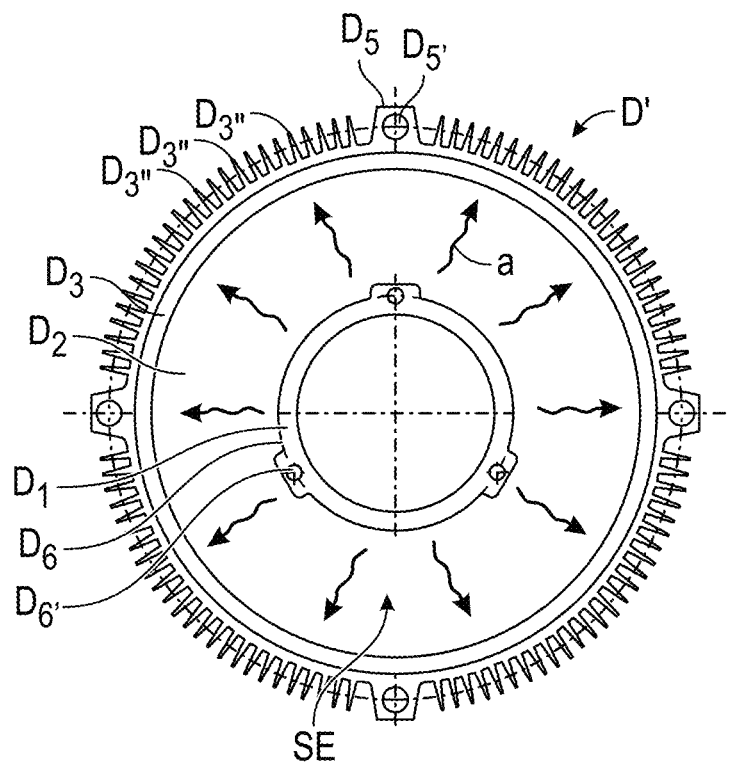
FIG. 17A shows a diagram of a top view of an end-plate having a space envelope formed therein between an inner hub portion and a peripheral portion, that includes arrows representing heat flowing away from the inner hub portion and towards the peripheral portion, e.g., when operating according to some embodiments of the present invention.
Figure 17B:
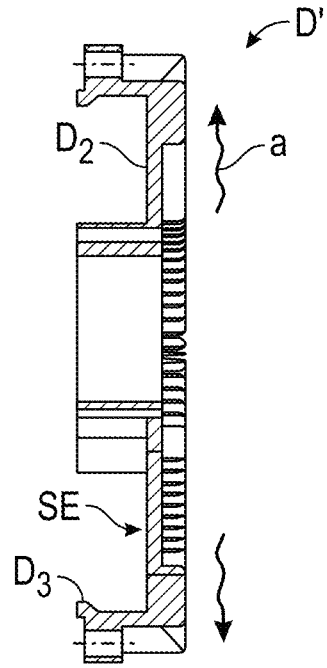
FIG. 17B shows a diagram of a side cross-sectional view of the end-plate in FIG. 17A having corresponding arrows representing heat flowing away from the inner hub portion and towards the peripheral portion of the end-plate, when operating according to some embodiments of the present invention.
Figure 17C:
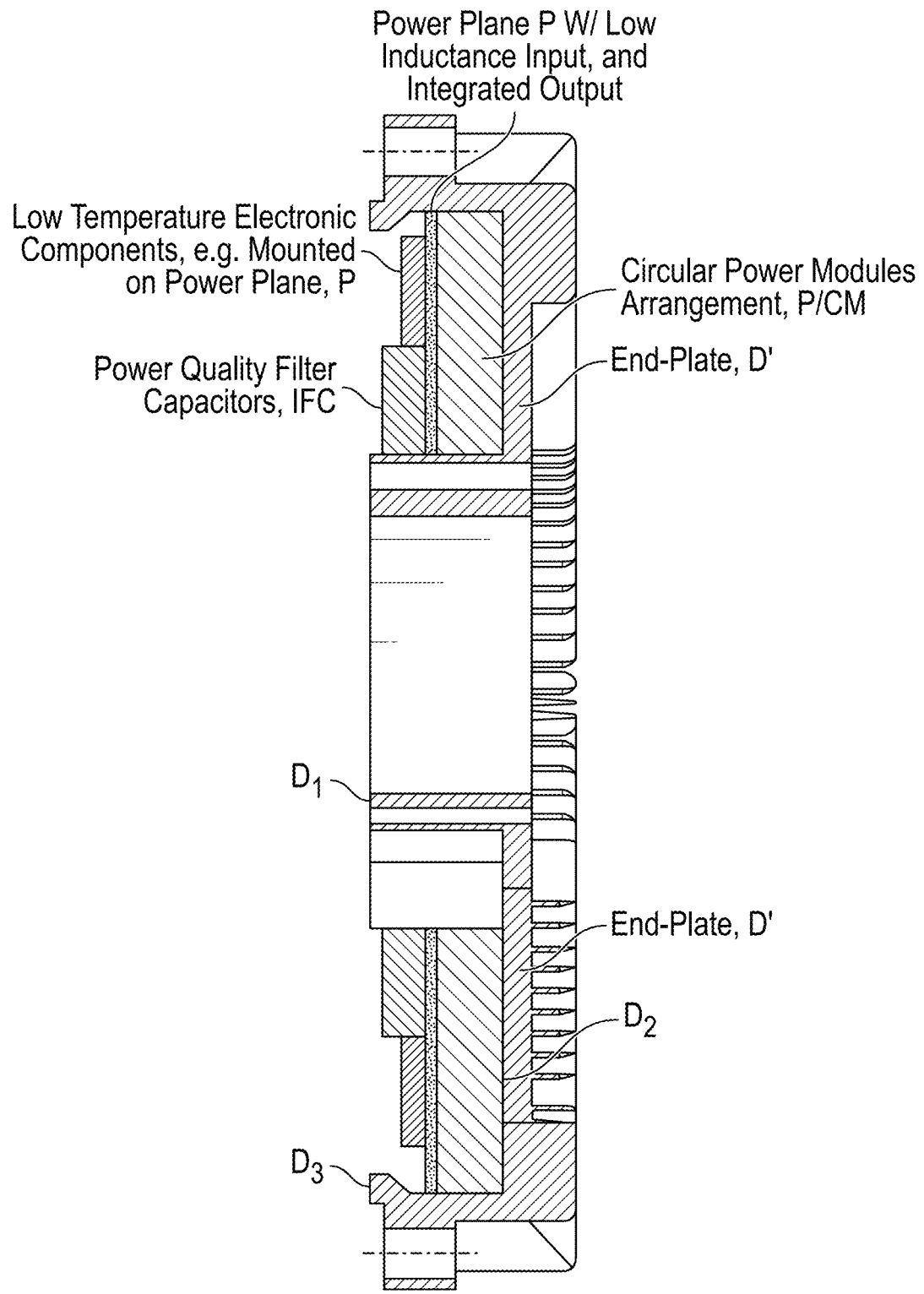
FIG. 17C shows a diagram of a side cross-sectional view of the end-plate in FIG. 17B having various modules and components arranged in the space envelope, including a circular power modules arrangement, power plane low inductance input and integrated output connections, low temperature electronic components, e.g., mounted on the power plane, and power quality filter capacitors, according to some embodiments of the present invention.
Figure 18A:
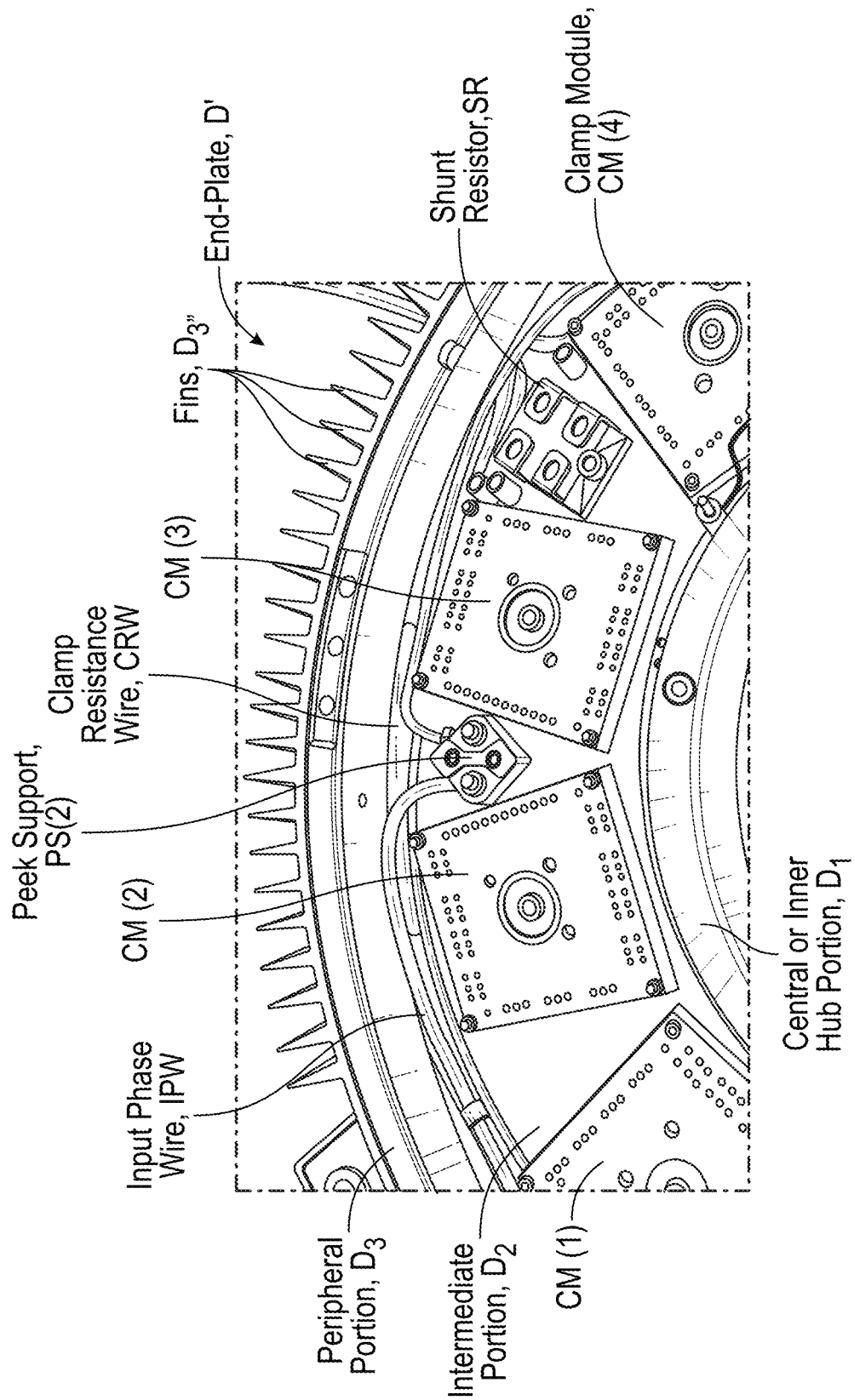
FIG. 18A showing a power modules layout that forms part of a motor assembly, all according to some embodiments of the present invention.
Figure 18B:
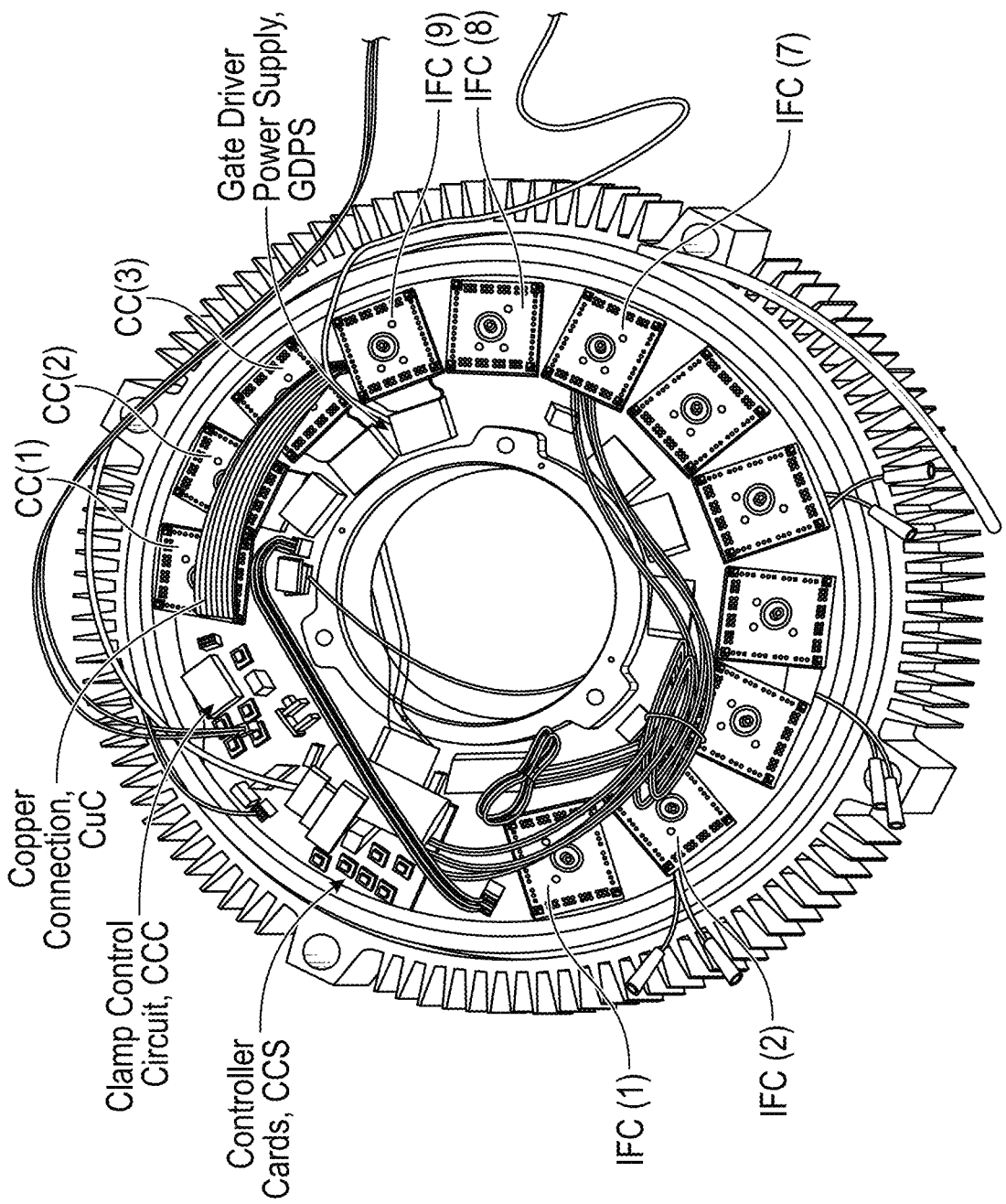
FIG. 18B shows a photograph of a final assembly of a matrix converter arranged in an end-plate, e.g., having a power plane circuit board with a gate driver power supply, a clamp circuit control, input filter capacitors clamp capacitors and control cards assembled thereon, according to some embodiments of the present invention.

By way of example, the power plane P may be configured to do at least the following:

1) allow the mounting of the power modules like elements P/CM (e.g., see FIGS. 10B and 17C) and the control electronics modules like elements IFC (e.g., see FIGS. 10B and 17C) on opposite sides of the thermal barrier, e.g., such as element P(1) shown in FIG. 10B;

2) provide the electrical connection paths (e.g., see connections $C_1$, $C_2$, $C_3$ and gate driver or layer connections GDC in FIGS. 7 and 18B) for interconnecting together the power modules like element P/CM and the control electronics modules like element IFC, as well as for interconnecting input/output power connections (see FIG. 18A re PEEK supports PS(2), re the input phase connection, and re the input phase wire with connection) and the power modules like element P/CM (e.g., see FIG. 17C) and the control electronics modules like element IFC (e.g., see FIG. 17C), and 3) insulate and/or direct heat emitted from one or more of the power modules like element P/CM (e.g., see FIG. 17C), the control electronics modules like element IFC (e.g., see FIG. 17C) and a shaft or rotor R of the motor M to the outer diameter of the power plane where there is a higher air flow, e.g., consistent with that shown in FIGS. 9A and 9B.

The power plane P may be configured as a doughnut shaped power plane printed circuit board or assembly like element P(1) in FIG. 10B in order to fit in the space envelope SE of the end-plate D, D' for providing a maximum space for mounting the power layer and the control layer, and to allow the shaft or rotor R to pass through to power the cooling fan F (see FIGS. 1 and 11).

The power layer may be configured with an arrangement of higher temperature power modules, e.g., like elements P/CM (FIG. 17C). The control layer may be configured with an arrangement of lower temperature control electronic components and power quality filter components, e.g., like elements IFC (FIGS. 7 and 17C). The thermal barrier and printed circuit board layer P(1) may be configured from a material having a structural thickness and strength to mount the control layer on one side and the power layer on an opposite side. The fiberglass material configured to provide insulation to reduce the transfer of heat between the power layer and the control layer.

It is understood that the power layer and the control layer may include other modules or components within the spirit of the present invention, e.g., consistent with that disclosed herein, including one or more control cards, clamp capacitors, a gate driver power supply, etc., e.g., as shown in FIGS. 10B and 18B.

Theory of Operation

In effect, the power plane P (see also FIGS. 1 and 11) is a component that will be mounted inside the space envelope SE (e.g., see FIG. 17B) of the end-plate D, D' (FIGS. 1 and 17B). It shares the same circular geometry, which will allow the shaft or rotor R to pass through to power the cooling fan F (FIGS. 1 and 11). By way of example, the circular geometry may take the form of, or be characterized as, doughnut-shaped, or disk-like, e.g., consistent with that disclosed herein. This will also allow ease of manufacture and installation of its components. The power plane P consists of several elements, e.g., which are shown and described in relation to FIGS. 6A-10B. The elements may include matrix converter power modules, matrix converter control electronics, power quality filter capacitors, and a printed circuit board, e.g., consistent with that disclosed herein. The function of the power plane P is threefold:

(1) provide a novel geometry allowing the mounting of power modules and control electronic components,
(2) provide an electric connection path for all modules and components, including power modules and control electronic components, mounted thereon, and
(3) insulate/direct heat emitted from all the electronic power modules, control electronics and motor shaft R (FIGS. 1 and 11).

Figure 6A:
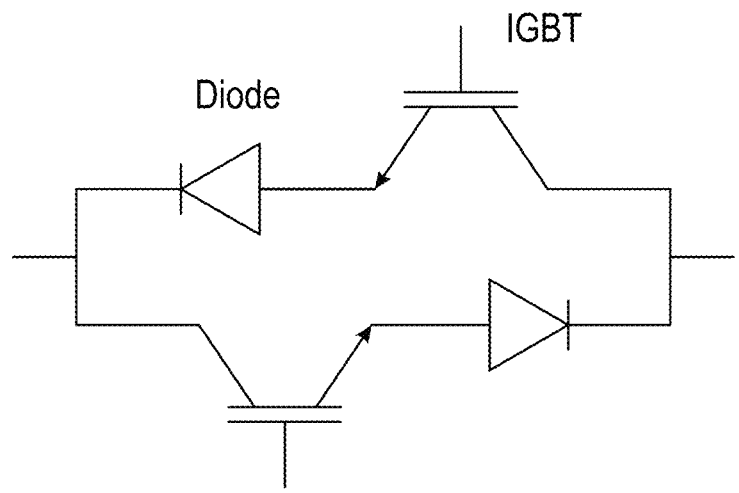
FIG. 6A shows a diagram of a bi-directional switch for implementing some part of the power functionality, e.g., of the power plane, according to some embodiments of the present invention.
Figure 6B:
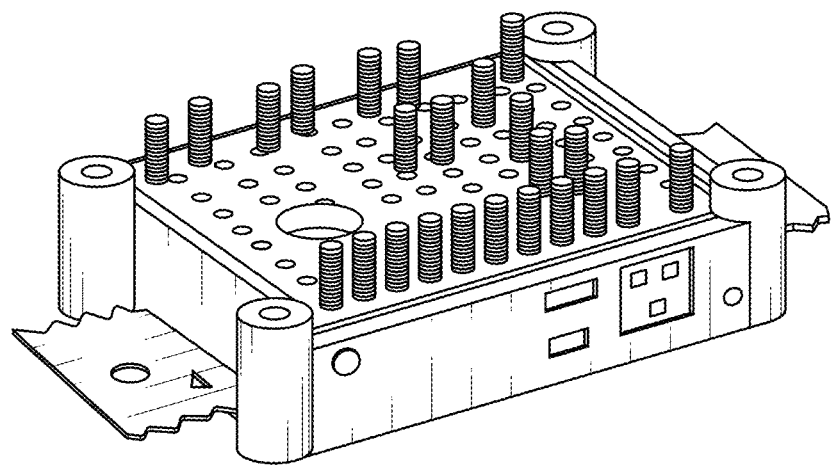
FIG. 6B shows an example of a bi-directional switch power module for implementing some part of the power functionality, according to some embodiments of the present invention.

The matrix converter is the main system configured on the power plane P, e.g., that is represented as shown in FIGS. 6A-6B, which includes FIG. 6A showing a diagram of a bi-directional switch, e.g., using IGBT technology for implementing the desired power functionality (FIG. 6A), and also includes FIG. 6B showing a photograph of an example of a bi-directional switch power module for implementing the desired power functionality. (As a person skilled in the art would appreciate, an insulated-gate bipolar transistor (IGBT) is a three-terminal power semiconductor device primarily used as an electronic switch which, as it was developed, came to combine high efficiency and fast switching. For example, Infineon Technologies AG distributed various products using such IGBT technology.) The purpose of having this circuit shown in FIG. 6A is to allow the matrix converter to convert an AC input of fixed voltage and frequency to a desired AC output waveform. Traditionally, in the prior art input AC power would have to be converted to a DC waveform before being synthesized into an AC output. According to some embodiments of the present invention, the matrix converter may be configured to execute this process in fewer steps and with fewer components. Among the electronic modules, the power quality filter IFC may be configured as a prominent component (see FIG. 7). In such a case, its function is to reduce the level of electrical noise and harmonic distortions, e.g., consistent with that shown in FIG. 8. In some embodiments according to the present invention, this power quality filter component may be preferably attached directly onto the printed circuit board, such as element P(1) to be as close to the matrix converter as possible. This greatly improves its ability to reduce the amount of distortions emitted from the matrix converter electronics. The overall geometry and size of the power plane P allows for ease of manufacture and installation for power modules and control electronics.

In this power plane portion of the overall motor assembly shown in FIGS. 1 and 11, heat will be emitted from at least two sources: the power semi-conductor modules and the shaft or rotor R (FIGS. 1 and 11). Consistent with that set forth herein, the power semi-conductor modules may include one or more of the following: the circular power modules arrangement shown in FIG. 17C or the power modules layout shown in FIGS. 18A, power modules and clamp module layout in FIG. 10B or the layout of the power/clamping modules in FIG. 10B. Although the mid-plate E, E' (e.g., see FIGS. 1, 2A, 2B and 3A-3B; 11, 12A, 12B, 13A(1)-13B) may be configured with an insulation layer protecting the electronics, as described above, there will likely still be residual heat from the shaft or rotor R. This is due to the temperature difference between the fan side and the mid-plate portion of the motor assembly (FIGS. 1 and 11). It is also understood that semi-conductors in the power plane P will naturally generate heat during operation. The challenge is maintaining an operating temperature in order for the electronics to operate properly, e.g., below the failure point of the electronics.

Therefore, insulation and dissipation of heat are two functions that the power plane P must perform. The former regarding insulation is achieved through the multi-layered circuit board implementation disclosed herein. The multi-layered circuit board may be constructed of laminated material such as fiberglass, by way of example, which increases its thickness and strength. Fiberglass is known and understood to be a strong and light-weight material which has been used for insulation applications. This allows the power plane P to act as a thermal barrier between hotter power modules, the power quality capacitors and control electronics.

For the latter, heat will be dissipated through the heat sink fins $D_{2'}$ and/or $D_{3''}$ (FIGS. 4A-4B and 14) located on the end-plate D, D'. The heat sink fins $D_{2'}$ and/or $D_{3''}$ will be air cooled and act as cooling mechanisms. They operate through conduction and convection, two forms of heat transfer, where conduction is understood to be the transfer of heat between solids that are in contact with each other, while convection is understood to be the transfer of heat between a solid and a fluid. Heat transfer will first occur between the printed circuit board and the semi-conductors. It will then travel into the end-plate D, D' and heat sink fins $D_{2'}$ and/or $D_{3''}$. Lastly, convection occurs between the heat fins $D_{3''}$ and the ambient air, e.g., surrounding the overall motor assembly 10 (FIG. 1) dispersing the heat. To function properly, the fins $D_{3''}$ have to be cooler to absorb heat and be elevated to a hot enough temperature to diffuse it into ambient air. Since the power plane P also shares a similar geometry with the intermediate portion $D_2$ of the end-plate D, the heat will be distributed uniformly along the surface.

The overall configuration of this multi-purpose power plane P makes it an important contribution to the state of the art. The space envelope SE (FIGS. 4B, 5D, 17B) from the end-plate D, D' allocates room for the overall power plane P and allows it to support both power modules and control electronics. In addition, the power plane P has access to the heat sink fins $D_2$, and/or $D_{3''}$ from the end-plate D; enabling it to cool the electronics at an operable temperature. The fiberglass circuit board construction of layer or element P(1) acts as an excellent insulator; separating hotter power semiconductors from the sensitive control electronics and power quality capacitors. These combined components allow the power plane P to facilitate operating conditions and maintain the temperature of the control electronics well below maximum temperature levels.

Advantages

Advantages of this power plane embodiment may include one or more of the following:

The printed circuit board layer P(1) may be configured to act as a thermal barrier between hotter power modules to the cooler control electronics and power quality capacitors area.

The overall power plane implementation may be configured so as to direct heat to outer diameter where there is a higher air flow and away from control circuits, e.g., as best represented by that shown in FIGS. 9A-9B.

Figure 8:
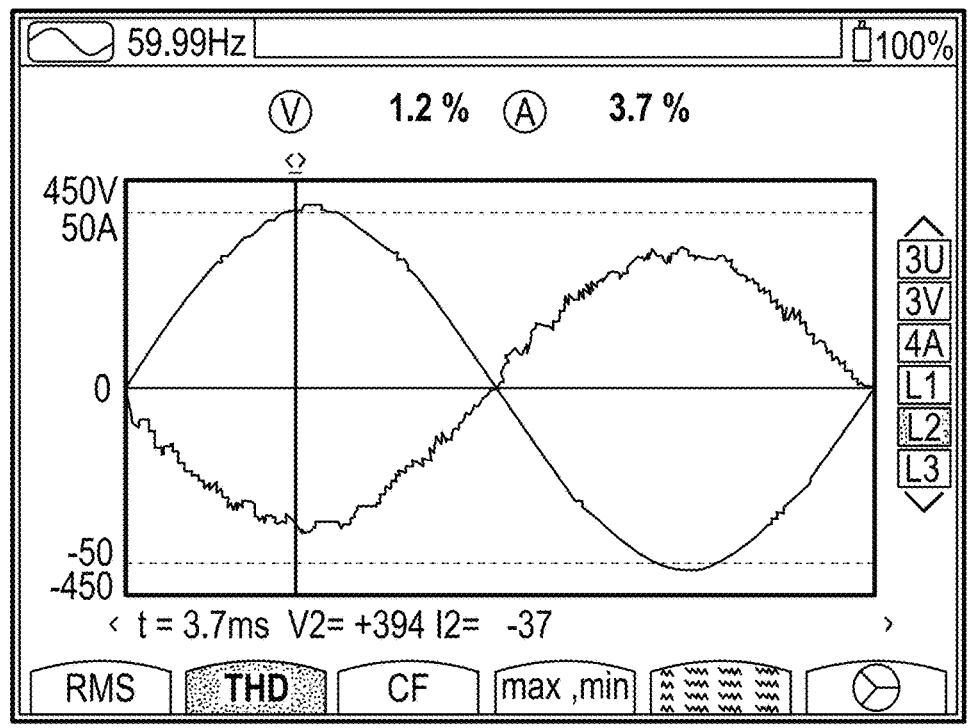
FIG. 8 shows a typical graph of a 40 HP EMD (aka a "variable frequency or speed drive) input voltage and current waveform.

The overall printed circuit board assembly provides a low inductance and resistance input between the power quality capacitors and the power semiconductor modules, thereby reducing switching stress and electromagnetic interference, e.g., consistent with that shown in the graph in FIG. 8.

The overall power plane implementation may be configured with a unique compact power quality filter arrangement that is integrated into the power plane P.

The overall power plane implementation may be configured with a built-in power quality filter that produces minimal harmonic distortion, and protects the variable frequency electronics from most power quality abnormalities.

The overall power plane implementation may be configured with or as a unique doughnut shaped power plane printed circuit board (PCB), e.g., shaped like element P(1), to fit in the space envelope SE of motor end-plate D providing for maximum space utilization, and simplifying construction and manufacturing. (By way of example, see that shown FIGS. 1 and 11, as well as that shown in FIGS. 7, 16 and 18B)

The doughnut shape allows the motor shaft or rotor R (FIGS. 1 and 11) to pass through to power the cooling fan F.

The overall power plane implementation combines both power and control modules, circuits or components into one integrated printed circuit board assembly, e.g., as shown in FIG. 18B, for ease of assembly and compactness in size.

The overall power plane implementation provides interconnections for input/output power, current sensors, gate driver GDPS, clamp control circuit CCs, power/clamp semiconductor modules, power quality capacitors IFC, e.g. with limited wiring and connectors required, thus allowing for a robust and reliable operation.

The overall power plane implementation allows for the manufacture of an embedded electronic motor drive in power levels greater than that currently produced in the marketplace and in the space envelope of an electric motor.

Figure 15:
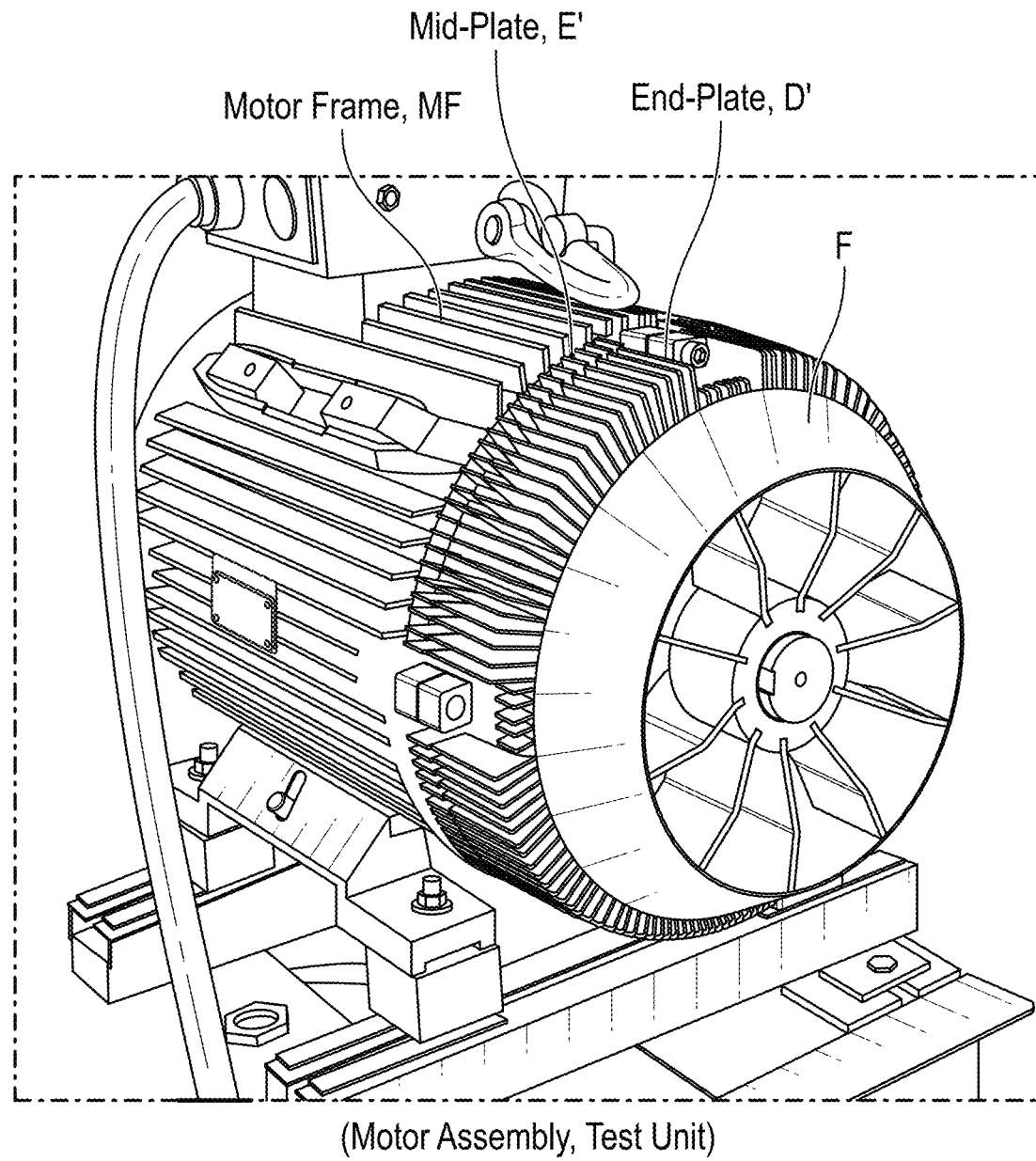
FIG. 15 shows a photograph of a motor assembly having labeled and identified a motor frame, a mid-plate, an end-plate, and a fan, e.g., according to some embodiments of the present invention.
Figure 16:
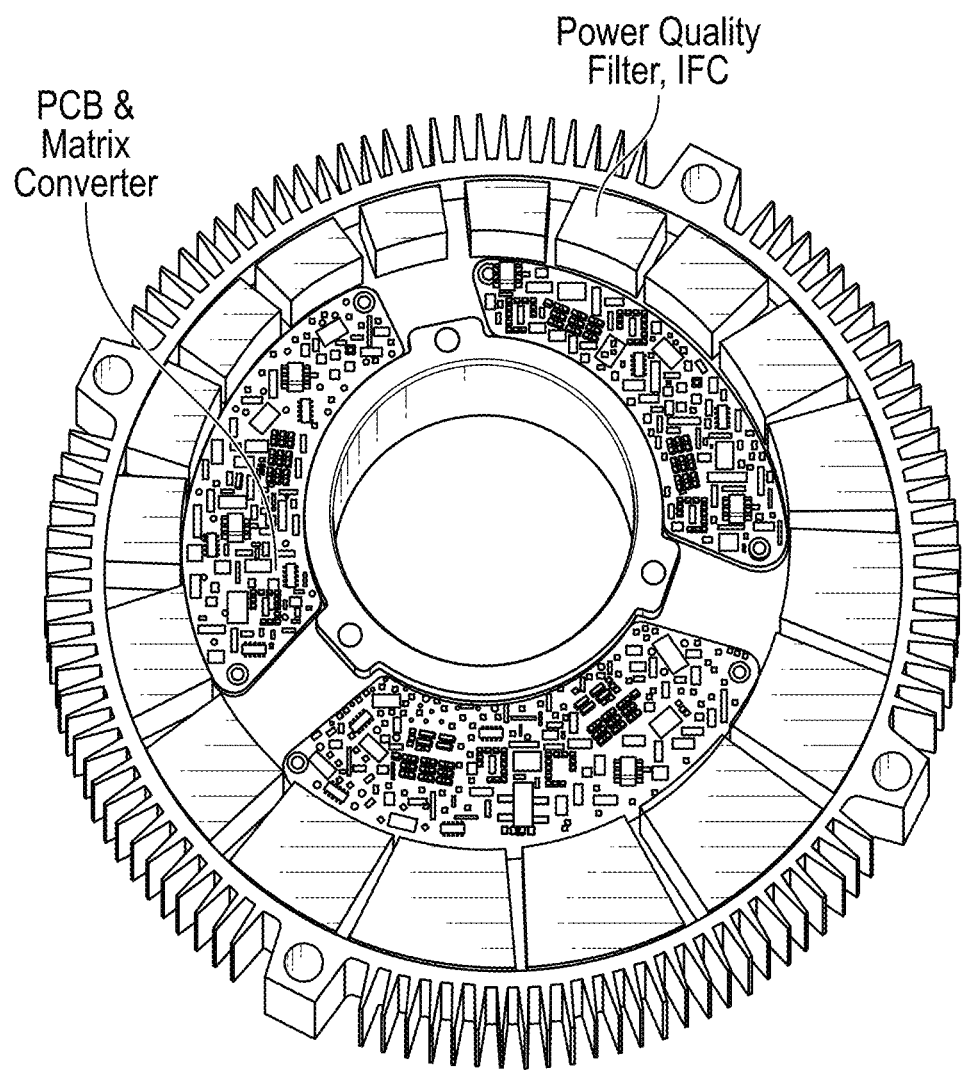
FIG. 16 shows a photograph of a motor end-plate having a power plane arranged therein and configured with a printed circuit board (PCB) and a matrix converter, according to some embodiments of the present invention.

The motor frame or casing MF (FIGS. 5A and 15) is effectively utilized as a heat sink to allow compact size and thermally optimized operation of the power plane P and matrix converter configuration.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A motor assembly, comprising:
a motor housing;
an electrical motor at least partially disposed in the motor housing;
a mid-plate disposed in-line with and proximate at least a portion of the motor housing, the mid-plate having a peripheral wall and a base wall that together define a first cavity, the mid-plate comprising a plurality of internal heat sink fins on the base wall that extend radially between a center of the mid-plate and the peripheral wall of the mid-plate and are configured to direct heat to the peripheral wall of the mid-plate;
a fan coupled to a rotor of the electrical motor;
an end-plate disposed in-line with and proximate at least a portion of the mid-plate such that the mid-plate is between the motor housing and the end-plate, the end-plate having a second cavity, wherein the end-plate is further disposed between the fan and the mid-plate, wherein the end-plate comprises heat sink fins disposed on an end wall of the end-plate and facing the fan, and wherein the fan is rotatable by the rotor to flow air over at least a portion of the heat sink fins of the end-plate to dissipate heat from the end-plate; and
a variable frequency drive electronics unit disposed within the second cavity and configured to provide power to the electrical motor.

2. The motor assembly of claim 1, wherein the variable frequency drive electronics unit comprises a circuit board, a plurality of power switching components and a plurality of power control components.

3. The motor assembly of claim 1, wherein the variable frequency drive electronics unit implements a matrix converter that converts an AC input signal to a converted AC output signal.

4. The motor assembly of claim 2, wherein the plurality of power control components comprises a plurality of power quality filter components mounted to the circuit board about the center of the circuit board.

5. The motor assembly of claim 1, wherein the heat sink fins are configured to dissipate heat from the end-plate.

6. The motor assembly of claim 1, wherein the mid-plate further comprises external heat sink fins on and about a peripheral portion of the mid-plate that are configured to dissipate heat from the mid-plate.

7. The motor assembly of claim 6 wherein the mid-plate has an opening configured to receive at least partially therethrough the rotor of the electrical motor, the rotor extending through a bearing assembly coupled to the mid-plate, the plurality of internal heat sink fins configured to direct heat from the rotor to a periphery of the mid-plate.

8. A motor assembly, comprising:
a motor housing;
an electrical motor at least partially disposed in the motor housing and having a rotor;
a mid-plate disposed in-line with and proximate at least a portion of the motor housing, the mid-plate having a peripheral wall and a base wall that together define a first cavity, the mid-plate having an opening configured to receive at least partially therethrough the rotor, the rotor extending through a bearing assembly coupled to the mid-plate, the mid-plate comprising a plurality of internal heat sink fins on the base wall that extend radially between a center of the mid-plate and the peripheral wall of the mid-plate and are configured to direct heat from the rotor to the peripheral wall of the mid-plate;

an end-plate disposed in-line with and proximate at least a portion of the mid-plate such that the mid-plate is between the motor housing and the end-plate, the end-plate having a second cavity and a plurality of heat sink fins configured to dissipate heat from the end-plate;

a fan mounted in-line with the end-plate and coupled to the rotor, wherein the fan is rotatable to flow air over at least a portion of the plurality of heat sink fins of the end-plate to dissipate heat from the end-plate, wherein the end-plate is further disposed between the fan and the mid-plate, wherein the plurality of heat sink fins are disposed on an end wall of the end-plate and facing the fan; and a variable frequency drive electronics unit disposed within the second cavity and configured to provide power to the electrical motor.

9. The motor assembly of claim 8, wherein the variable frequency drive electronics unit comprises a circuit board, a plurality of power switching components and a plurality of power control components.

10. The motor assembly of claim 8, wherein the variable frequency drive electronics unit implements a matrix converter that converts an AC input signal to a converted AC output signal.

11. The motor assembly of claim 9, wherein the plurality of power control components comprises a plurality of power quality filter components mounted to the circuit board about the center of the circuit board.

12. The motor assembly of claim 8, wherein the mid-plate further comprises external heat sink fins on a peripheral portion of the mid-plate that are configured to dissipate heat from the mid-plate.

13. The motor assembly of claim 12 wherein the plurality of internal heat sink fins are configured to direct heat from the rotor to a periphery of the mid-plate.

14. An assembly, comprising:
a mid-plate configured to be disposed in-line with and proximate at least a portion of a motor housing, the mid-plate having a peripheral wall and a base wall that together define a first cavity, the mid-plate comprising a plurality of internal heat sink fins on the base wall that extend radially between a center of the mid-plate and the peripheral wall of the mid-plate and are configured to direct heat to the peripheral wall of the mid-plate;

a fan coupled to a rotor of an electrical motor;

an end-plate configured to be disposed in-line with and proximate at least a portion of the mid-plate such that the mid-plate is disposed between the motor housing and the end-plate, the end-plate having a second cavity and a plurality of heat sink fins on a surface of the end-plate configured to dissipate heat from the end-plate, wherein the end-plate is further disposed between the fan and the mid-plate, wherein the plurality of heat sink fins are disposed facing the fan, and wherein the fan is rotatable by the rotor to flow air over at least a portion of the plurality of heat sink fins of the end-plate to dissipate the heat from the end-plate; and a variable frequency drive electronics unit disposed within the second cavity and configured to provide power to the electrical motor.

15. The assembly of claim 14, wherein the variable frequency drive electronics unit comprises a circuit board, a plurality of power switching components and a plurality of power control components.

16. The assembly of claim 14, wherein the variable frequency drive electronics unit implements a matrix converter that converts an AC input signal to a converted AC output signal.

17. The assembly of claim 15, wherein the plurality of power control components comprises a plurality of power quality filter components mounted to the circuit board about the center of the circuit board.

18. The assembly of claim 14, wherein the mid-plate further comprises external heat sink fins on and about a peripheral portion of the mid-plate that are configured to dissipate heat from the mid-plate.

19. The assembly of claim 18, wherein the mid-plate has an opening configured to receive at least partially therethrough the rotor, the rotor extending through a bearing assembly coupled to the mid-plate, the plurality of internal heat sink fins configured to direct heat from the rotor to a periphery of the mid-plate.

* * * * *